United States Patent
Aoyama

(10) Patent No.: US 10,284,795 B2
(45) Date of Patent: May 7, 2019

(54) IMAGE PROCESSING DEVICE, IMAGE PROCESSING METHOD, AND IMAGE PROCESSING PROGRAM WHICH CONTROL A SCAN FREQUENCY OF AN IMAGING UNIT

(71) Applicant: HONDA MOTOR CO., LTD., Tokyo (JP)

(72) Inventor: Chiaki Aoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 15/459,663

(22) Filed: Mar. 15, 2017

(65) Prior Publication Data

US 2017/0289474 A1 Oct. 5, 2017

(30) Foreign Application Priority Data

Mar. 29, 2016 (JP) .................................. 2016-066683

(51) Int. Cl.
| | |
|---|---|
| *G06K 9/46* | (2006.01) |
| *H04N 5/225* | (2006.01) |
| *H04N 5/235* | (2006.01) |
| *H04N 5/353* | (2011.01) |

(52) U.S. Cl.
CPC ......... *H04N 5/3537* (2013.01); *G06K 9/4604* (2013.01); *G06K 9/4661* (2013.01); *H04N 5/2256* (2013.01); *H04N 5/2351* (2013.01)

(58) Field of Classification Search
CPC .. H04N 5/3537; H04N 5/2351; H04N 5/2256; G06K 9/4604; G06K 9/4661
See application file for complete search history.

(56) References Cited

U.S. PATENT DOCUMENTS

| | | | |
|---|---|---|---|
| 2009/0225189 A1* | 9/2009 | Morin | H04N 5/345 348/229.1 |
| 2015/0350555 A1* | 12/2015 | Nishi | H04N 5/23293 348/333.02 |
| 2016/0142645 A1* | 5/2016 | Shionoya | H04N 5/343 348/218.1 |
| 2016/0316132 A1* | 10/2016 | Kinoshita | H04N 5/345 |

FOREIGN PATENT DOCUMENTS

JP 2010-130438 6/2010

* cited by examiner

*Primary Examiner* — Gevell V Selby
(74) *Attorney, Agent, or Firm* — Rankin, Hill & Clark LLP

(57) ABSTRACT

An image processing device is an image processing device including a control unit configured to control a scan frequency of a region of an imaging unit, and an analysis unit configured to analyze a captured image captured in the imaging unit, and the analysis unit is configured to analyze the captured image to detect an optical signal transmitted from a signal source, identify an attribute of the signal source on the basis of information included in the detected optical signal, and set a region including the signal source in the captured image in a region with a different scan frequency, and the control unit is configured to control a scan frequency of the imaging unit for each region that is set in the captured image.

10 Claims, 22 Drawing Sheets

FIG. 21

INFRASTRUCTURE LIST ITEMS

| | |
|---|---|
| ID | ID OF LIGHT SOURCE |
| TIME | TIME AT WHICH INFORMATION WAS UPDATED |
| TYPE | TYPE<br>(STREET LAMP AND TRAFFIC LIGHT)<br>OF LIGHT SOURCE |
| RELATIVE COORDINATES | DIRECTION OR DISTANCE OF LIGHT SOURCE |
| COORDINATES | ABSOLUTE COORDINATES<br>(LONGITUDE, LATITUDE, AND ALTITUDE)<br>OF LIGHT SOURCE |
| ADDRESS | NETWORK ADDRESS |
| STATE | STATE (BLUE, YELLOW, AND RED)<br>OF LIGHT SOURCE |
| PRIORITY | WEIGHT FOR CALCULATING PRIORITY |
| PRIORITY STATE | INTEGRAL VALUE OF WEIGHT OF PRIORITY |
| PROCESSING STATE | TRACKING STATE (WAITING AND TRACKING) |

FIG. 22

VEHICLE LIST ITEMS

| | |
|---|---|
| ID | ID OF LIGHT SOURCE |
| TIME | TIME AT WHICH INFORMATION WAS UPDATED |
| TYPE | TYPE (FOUR-WHEELER, TWO-WHEELER, LIGHT VEHICLE, AND HUMAN) OF LIGHT SOURCE |
| RELATIVE COORDINATES | DIRECTION OR DISTANCE OF LIGHT SOURCE |
| COORDINATES | ABSOLUTE COORDINATES (LONGITUDE, LATITUDE, AND ALTITUDE) OF LIGHT SOURCE |
| ADDRESS | NETWORK ADDRESS |
| ROAD ID | ID OF TRAVEL ROAD |
| TRAVEL LANE | LANE INFORMATION OF VEHICLE |
| VEHICLE SPEED | TRAVEL SPEED |
| ORIENTATION | TRAVEL ORIENTATION OF VEHICLE |
| STATE | MOTION STATE (STOP, ACCELERATION, DECELERATION, CRUISE CONTROL, AND LANE CHANGE) |
| PRIORITY | WEIGHT FOR CALCULATING PRIORITY |
| PRIORITY STATE | INTEGRAL VALUE OF WEIGHT OF PRIORITY |
| PROCESSING STATE | TRACKING STATE (WAITING AND TRACKING) |

FIG. 23

|  | LIGHT SOURCE A | LIGHT SOURCE B | LIGHT SOURCE C |
|---|---|---|---|
| ID | SL0001 | SL0002 | SL0003 |
| TIME | 10:10:01 | 10:10:02 | 10:10:03 |
| TYPE | STREET LAMP | STREET LAMP | STREET LAMP |
| RELATIVE COORDINATES | -40°,40°,20m | -20°,10°,200m | 30°,20°,100m |
| COORDINATES | 35.781686,139.614359 | 35.781222,139.613901 | 35.7814022, 139.6141234 |
| ADDRESS | www.aaa.bbb.cc01 | www.aaa.bbb.cc02 | www.aaa.bbb.cc03 |
| STATE | - | - | - |
| PRIORITY | 4 | 2 | 1 |
| PRIORITY STATE | 0 | 2 | 1 |
| PROCESSING STATE | TRACKING | TRACKING | TRACKING |

FIG. 24

| NUMBER OF TIMES OF READOUT | LIGHT SOURCE A (PRIORITY: 4) | LIGHT SOURCE B (PRIORITY: 2) | LIGHT SOURCE C (PRIORITY: 1) |
|---|---|---|---|
| 1 | 0 | 0 | 0 |
| 2 | 0 | 2 | 1 |
| 3 | 4 | 0 | 2 |
| 4 | 0 | 2 | 3 |
| 5 | 4 | 4 | 0 |
| 6 | 0 | 6 | 1 |
| 7 | 4 | 0 | 2 |
| 8 | 0 | 2 | 3 |
| 9 | 4 | 4 | 0 |
| 10 | 0 | 6 | 1 |
| 11 | 4 | 0 | 2 |
| 12 | 0 | 2 | 3 |
| 13 | 4 | 4 | 0 |
| 14 | 0 | 6 | 1 |
| 15 | 4 | 0 | 2 |
| 16 | 0 | 2 | 3 |
| 17 | 4 | 4 | 0 |
| 18 | 0 | 6 | 1 |

FIG. 25

| NUMBER OF TIMES OF READOUT | LIGHT SOURCE A (PRIORITY: 5) | LIGHT SOURCE B (PRIORITY: 4) | LIGHT SOURCE C (PRIORITY: 3) | LIGHT SOURCE D (PRIORITY: 2) | LIGHT SOURCE E (PRIORITY: 1) |
|---|---|---|---|---|---|
| 1 | 0 | 0 | 0 | 0 | 0 |
| 2 | 0 | 0 | 3 | 2 | 1 |
| 3 | 5 | 4 | 0 | 0 | 2 |
| 4 | 0 | 0 | 3 | 2 | 3 |
| 5 | 5 | 4 | 0 | 4 | 0 |
| 6 | 0 | 0 | 3 | 6 | 1 |
| 7 | 5 | 4 | 0 | 0 | 2 |
| 8 | 0 | 0 | 3 | 2 | 3 |

IMAGE PROCESSING DEVICE, IMAGE PROCESSING METHOD, AND IMAGE PROCESSING PROGRAM WHICH CONTROL A SCAN FREQUENCY OF AN IMAGING UNIT

CROSS-REFERENCE TO RELATED APPLICATION

Priority is claimed on Japanese Patent Application No. 2016-066683, filed Mar. 29, 2016, the content of which is incorporated herein by reference.

BACKGROUND OF THE INVENTION

Field of the Invention

The present invention relates to an image processing device, an image processing method, and an image processing program.

Description of Related Art

Conventionally, an optical communication system using light has been proposed. In the optical communication system, a transmission device includes a light emitting element such as a light emitting diode (LED), and emits intensity-modulated light using the light emitting element to transmit information. A reception device includes a photodiode, and receives and demodulates the light emitted by the transmission device to receive information. Specifically, the reception device reads charges generated through photoelectric conversion in the photodiode a plurality of times during one period of carrier waves composed of intensity-modulated light to perform demodulation according to intensity modulation.

In a light reception device in an optical communication system, there is a device that switches an imaging mode from a mode of imaging a full angle of view in an imaging region captured by an imaging unit to a mode of imaging one partial region, specifies a position of a light source transmitting information in one partial region, and acquires information that is transmitted from the light source (for example, see Japanese Unexamined Patent Publication Application, First No. 2010-130438).

SUMMARY OF THE INVENTION

However, in the device of the related art that switches the imaging mode from the mode of imaging a full angle of view to the mode of imaging one partial region, it is difficult to specify a position of another light source that is imaged in the full angle of view and acquire information or it may be necessary to track a plurality of light sources at the same time after the imaging mode is switched to the mode of imaging one partial region.

An aspect according to the present invention has been made in view of the above problems, and an object thereof is to provide an image processing device, an image processing method, and an image processing program that acquire information that is transmitted from a plurality of signal sources of which the number, position, priority, or the like is dynamically changed.

In order to achieve the above object, the present invention has adopted the following aspects.

(1) An image processing device according to an aspect of the present invention is an image processing device, including: a control unit configured to control a scan frequency of a region of an imaging unit; and an analysis unit configured to analyze a captured image captured in the imaging unit, wherein the analysis unit is configured to analyze the captured image to detect an optical signal transmitted from a signal source, identify an attribute of the signal source on the basis of information included in the detected optical signal, and set a region including the signal source in the captured image in a region with a different scan frequency, and the control unit is configured to control a scan frequency of the imaging unit for each region that is set in the captured image.

(2) In the aspect (1), the control unit may be configured to scan a first region that is set in the captured image at a first frequency, scan a second region that is set in the captured image at a second frequency, and scan a third region including the signal source at a third frequency based on the identified attribute of the signal source.

(3) In the aspect (2), the control unit may be configured to set the first region on an upper side of the captured image.

(4) In the aspect (2) or (3), the control unit may be configured to set the second region in a region in which the third region is highly likely to appear.

(5) In any one of the aspects (2) to (4), the analysis unit may be configured to calculate a priority on the basis of the attribute of the signal source, and set the third frequency on the basis of the calculated priority.

(6) In any one of the aspects (2) to (5), the analysis unit may be configured to analyze the captured image to identify a fourth region included in the captured image, and determines whether the third region is in the fourth region when the identified attribute of the signal source is a first attribute, and the control unit may be configured to set the third frequency when the third region is determined to be in the fourth region to be higher than the third frequency when the third region is determined not to be in the fourth region.

(7) In the aspect (6), the analysis unit may be configured to analyze the captured image to detect optical signals transmitted from a plurality of signal sources, and set a plurality of third regions in the captured image, and when each of the plurality of third regions is determined not to be in the fourth region, the control unit may be configured to change the third frequency according to respective positions in the captured image of the plurality of third regions.

(8) In the aspect (6) or (7), the analysis unit may be configured to identify the same lane as the lane on a road on which the own vehicle travels as the fourth region, and determine whether the third region including a signal source of another vehicle travels on the same lane as the own vehicle when the first attribute is the other vehicle.

(9) In any one of the aspects (1) to (8), the analysis unit may be configured to calculate a position of the own vehicle on the basis of coordinate information included in the detected optical signal when the identified attribute of the signal source is a second attribute.

(10) In any one of the aspects (1) to (9), an attribute of the signal source may be information on whether the signal source is infrastructure or a vehicle, and information on a position of a signal source relative to the vehicle.

(11) An image processing method according to an aspect of the present invention is an image processing method, including: a control step of controlling a scan frequency of a region of an imaging unit; and an analysis step of analyzing a captured image captured in the imaging unit, wherein the analysis step includes steps of analyzing the captured image to detect an optical signal transmitted from a signal source, identifying an attribute of the signal source on the basis of information included in the detected optical signal, and setting a region including the signal source in the captured image in a region with a different scan frequency, and the control step includes a step of controlling a scan frequency of the imaging unit for each region that is set in the captured image.

(12) An image processing program according to an aspect of the present invention is an image processing program that causes a computer to execute: a control procedure of controlling a scan frequency of a region of an imaging unit; and an analysis procedure of analyzing a captured image captured in the imaging unit, wherein the analysis procedure includes procedures of analyzing the captured image to detect an optical signal transmitted from a signal source, identifying an attribute of the signal source on the basis of information included in the detected optical signal, and setting a region including the signal source in the captured image in a region with a different scan frequency, and the control procedure includes a procedure of controlling a scan frequency of the imaging unit for each region that is set in the captured image.

According to the above-described aspects (1) to (12), it is possible to provide an image processing device, an image processing method, and an image processing program for acquiring information that is transmitted from a plurality of signal sources of which the number, position, priority, or the like is dynamically changed.

In the case of the above-described (2), since the first region and the second region are scanned at different frequencies, it is easy to detect the optical signal transmitted from signal sources of which the number is dynamically changed.

In the case of the above-described (3), it is possible to scan the captured image at a frequency according to the signal source. That is, it is possible to scan a fixed signal source such as a street lamp or a traffic light (traffic light device) that is imaged on an upper side of the captured image at a first frequency, and to prevent a moving signal source such as another vehicle that is difficult to image on the upper side of the captured image from being scanned at the first frequency. Accordingly, it is possible to perform scan of a suitable signal source when the image processing device is applied to an intelligent transport system (ITS).

In the case of the above-described (4), detection of an appearing signal source is facilitated.

In the case of the above-described (5) or (10), it is possible to achieve the scan frequency suitable for the signal source by calculating the priority according to the attribute of the signal source.

In the case of the above-described (6), it is possible to acquire information on the signal source in the fourth region with high accuracy, and to acquire information with accuracy suitable for a signal source outside the fourth region. For example, it is possible to acquire the information on the other vehicle having greater influence on the own vehicle with high accuracy by setting the fourth region in a region in which an influence on the own vehicle is great, and to acquire the information on the other vehicle having a small influence on the own vehicle with appropriate accuracy.

In the case of the above-described (7), it is possible to acquire information for the signal source outside the fourth region with accuracy according to the position of the signal source. For example, in another vehicle having a small influence on the own vehicle, it is possible to acquire information with accuracy suitable for the position of the other vehicle.

In the case of the above-described (8), it is possible to acquire information of a preceding vehicle or the like traveling in the same lane as the own vehicle with high accuracy.

In the case of the above-described (9), it is possible to accurately calculate the position of the own vehicle.

BRIEF DESCRIPTION OF THE DRAWINGS

FIG. 21 is a diagram illustrating an example of infrastructure list items that are used for image processing according to an embodiment.

FIG. 22 is a diagram illustrating an example of vehicle list items that are used for image processing according to an embodiment.

FIG. 23 is a diagram illustrating an example of an infrastructure list in FIG. 21.

FIG. 24 is a diagram illustrating an example of setting of a scan frequency in image processing according to an embodiment.

FIG. 25 is a diagram illustrating another example of the setting of the scan frequency in the image processing according to the embodiment.

DETAILED DESCRIPTION OF THE INVENTION

Hereinafter, an image processing device, an image processing method, and an image processing program according to an embodiment of the present invention will be described with reference to the drawings.

Figure 1:
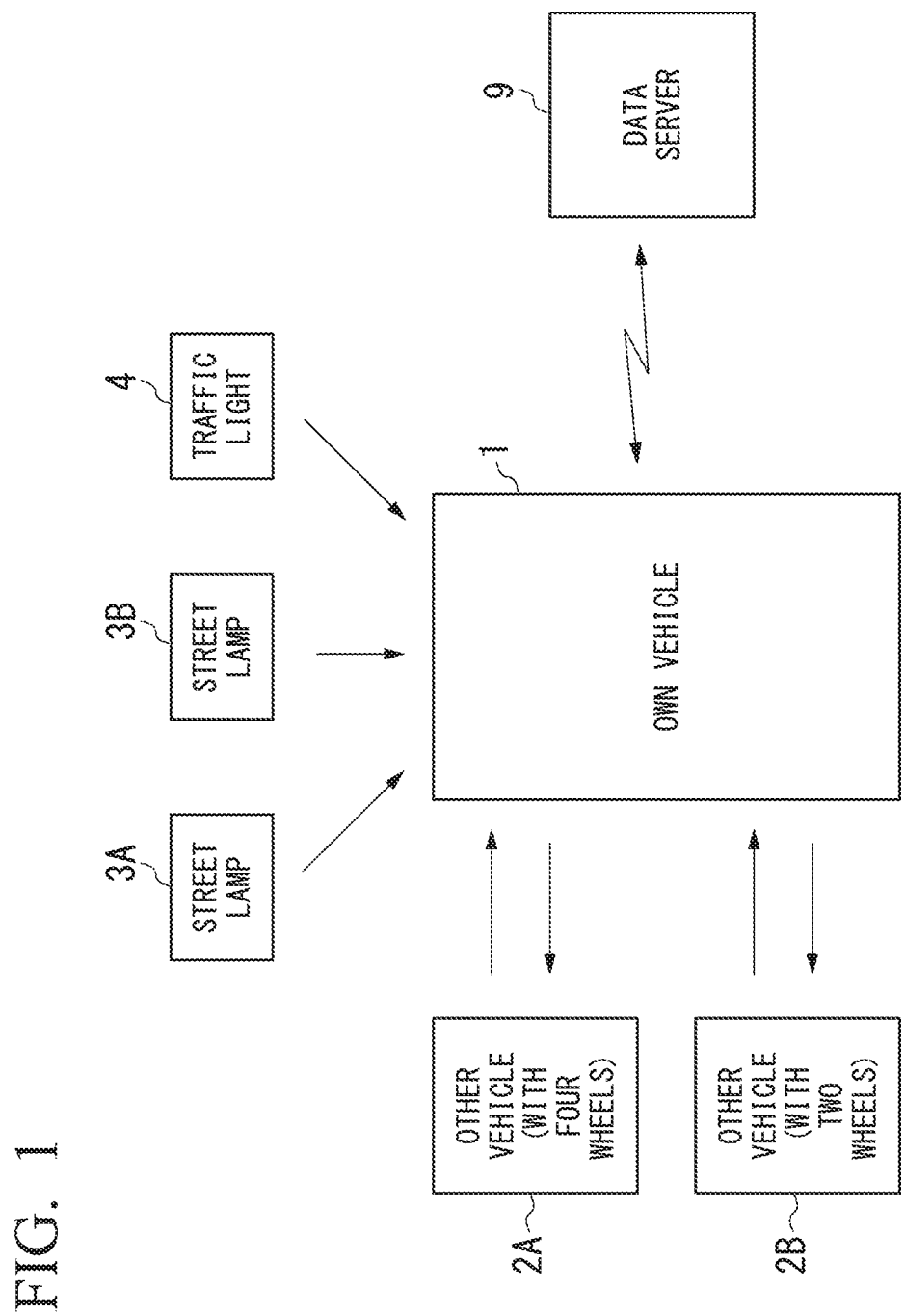
FIG. 1 is a block diagram illustrating an example of a configuration of an image processing system according to an embodiment.

First, an overview of an image processing system will be described with reference to FIG. 1. FIG. 1 is a block diagram illustrating an example of a configuration of an image processing system according to the embodiment.

In FIG. 1, an image processing system includes an own vehicle 1 including an image processing device. The own vehicle 1 is a vehicle such as a four-wheeled vehicle (hereinafter abbreviated as "four-wheeler"), a saddle type two-wheeled vehicle (hereinafter referred to as "two-wheeler"), or a light vehicle, but a moving body such as a pedestrian or a humanoid robot may be included. The own vehicle 1 performs optical communication with other vehicles using optical signals. FIG. 1 illustrates two vehicles including another vehicle 2A with four wheels and another vehicle 2B with two wheels as other vehicles 2, but the number of other vehicles 2 is not limited thereto. Arrows between the own vehicle 1 and the other vehicle 2A or the other vehicle 2B illustrated in FIG. 1 indicate a transmission direction of the optical signal. The own vehicle 1 is assumed to be able to perform optical communication in both directions of transmission and reception with the other vehicle 2A or the other vehicle 2B. The optical signal includes identification information (ID: Identification) of the light source. The optical signal may include information such as a type of light source, a movement speed of the light source, a position of the light source, a travel direction of the light source, and a state of the light source. In this embodiment, a light source (signal source) included in a moving vehicle or the like is described as a "vehicle." A type of light source in the case where the light source is a vehicle is, for example, a four-wheeler, a two-wheeler, or a light vehicle.

Further, the movement speed of the light source is a speed of the vehicle (vehicle speed). Further, the position of the light source is a position of the vehicle, and a travel direction of the light source is a travel direction of the vehicle. The state of the light source is a motion state (stop, acceleration, deceleration, constant speed, lane change, or the like) of the vehicle. The own vehicle 1 and the other vehicle 2A or the other vehicle 2B can recognize a positional relationship therebetween, a relative speed, or the like by transmitting and receiving information of an optical signal.

The own vehicle 1 receives optical signals from the street lamp 3A, the street lamp 3B, and the traffic light 4. FIG. 1 illustrates two street lamps 3A and 3B as street lamps and one traffic light 4 as a traffic light, but the number of street lamps and traffic lights is not limited thereto. In this embodiment, a light source of which a position is fixed, such as a street lamp or a traffic light, is referred to as "infrastructure." An optical signal transmitted by the infrastructure includes an ID of the light source. Further, the optical signal can include information such as a type (a street lamp, a traffic light, a sign, or the like) of infrastructure, coordinates (longitude, latitude, altitude, or the like) of the infrastructure, and a state of the infrastructure (a lighting state (blue, yellow, red, lighting or flickering, stopping, or the like) of a traffic light). By receiving the optical signal transmitted by the infrastructure, the own vehicle 1 can acquire the information as described above while traveling.

In FIG. 1, a case in which the own vehicle 1 performs bidirectional communication in optical communication with the other vehicle 2, and performs unidirectional communication (reception) from infrastructure in optical communication with the infrastructure is illustrated, but the communication direction of the optical communication performed by the own vehicle 1 is not limited thereto. For example, the own vehicle 1 may perform unidirectional optical communication (reception) from a light vehicle when the other vehicle 2 is the light vehicle. Further, the own vehicle 1 may perform bidirectional communication in optical communication with the infrastructure. Further, the own vehicle 1 may perform multiplexed optical communication using a plurality of modulations.

The own vehicle 1 communicates with a data server 9. For example, the data server 9 stores information in which identification information of a light source, a type of light source, a position of the light source, and the like are associated, and is not necessarily fixed, but may be present in a moving body such as the own vehicle or other vehicles. It is assumed that the data server 9 can provide the stored information to the own vehicle 1 through communication. For example, on the basis of the identification information of the light source acquired from the light source, the own vehicle 1 may acquire information such as the type of light source corresponding to the identification information or the position of the light source from the data server 9. Communication between the own vehicle 1 and the data server 9 can be assumed to be performed according to a communication scheme such as communication of a mobile phone via a base station, communication via a wireless LAN access point, or communication through optical communication. Since the own vehicle 1 can acquire information corresponding to information acquired from the infrastructure or the vehicle from the data server 9 by performing communication with the data server 9, it is possible to shorten data of optical communication acquired from the light source and to reduce a processing load of the optical communication.

Figure 2:
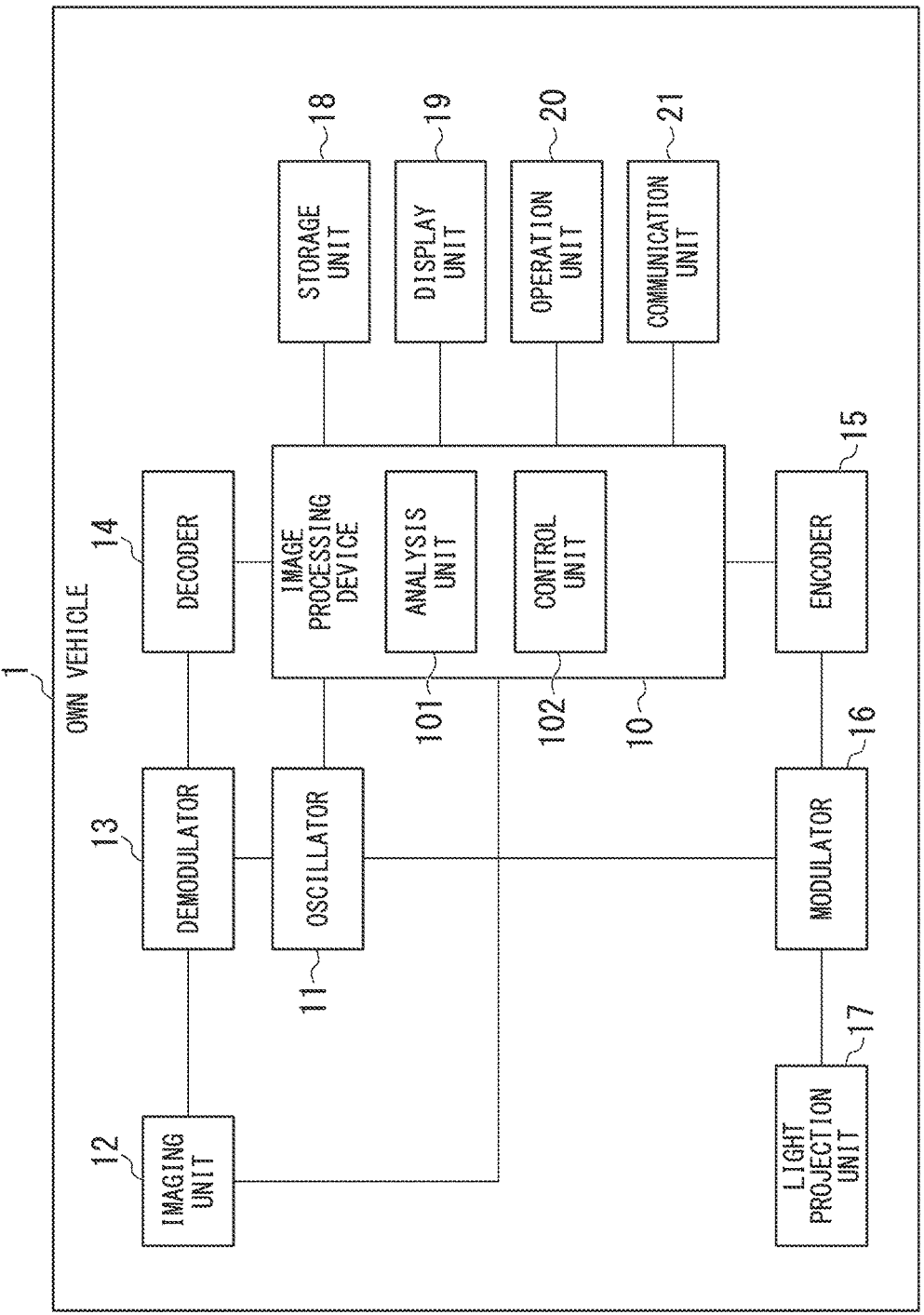
FIG. 2 is a block diagram illustrating an example of a configuration of an own vehicle having the image processing device according to an embodiment.

Next, details of the own vehicle 1 described with reference to FIG. 1 will be described with reference to FIG. 2. FIG. 2 is a block diagram illustrating an example of a configuration of the own vehicle 1 including the image processing device according to the embodiment.

In FIG. 2, the own vehicle 1 has functions of an image processing device 10, an oscillator 11, an imaging unit 12, a demodulator 13, a decoder 14, an encoder 15, a modulator 16, a light projection unit 17, a storage unit 18, a display unit 19, an operation unit 20, and a communication unit 21. The image processing device 10 has functions of an analysis unit 101 and a control unit 102. The above-described functions of the image processing device 10 are functional modules that are realized by hardware.

The oscillator 11 generates a clock signal used in the image processing device 10, the demodulator 13, and the modulator 16, and outputs the generated clock signal to the image processing device 10, the demodulator 13, and the modulator 16.

The imaging unit 12 is a device that is fixed to the own vehicle 1 and images a travel direction of the own vehicle 1. It is assumed that a focus direction of the imaging unit 12 is fixed at a predetermined solid angle with respect to front, back, left, and right directions of the own vehicle 1. The imaging unit 12 generates a captured image on the basis of light having a predetermined angle of view collected by a lens (not illustrated). The imaging unit 12 has a structure in which a plurality of pixels are two-dimensionally arranged as described below. The imaging unit 12 generates and accumulates charges according to light received by the pixels and outputs the charges accumulated at a predetermined timing to the demodulator 13 to generate a captured image. Further, for the imaging unit 12, an imaging element according to a wavelength of light to be received may be used, a plurality of lenses, filters, imaging elements, and the like may be arranged according to a capturing period of an image or may be arranged so that distance measurement according to stereoscopic vision can be performed, or imaging elements with different resolutions may be combined and used.

The demodulator 13 performs demodulation according to a modulation scheme used for modulation in a signal source on the reception signal of the captured image acquired from the imaging unit 12, and outputs the demodulated reception signal to the decoder 14. In optical communication, a transmission side modulates predetermined encoded information to transmit resultant information as an optical pulse. A reception side receives, demodulates, and decodes the optical pulse transmitted by the transmission side to acquire predetermined information. In the optical communication, a modulation scheme used on the transmission side is, for example, a scheme such as $2\pi/3$-differential binary phase shift keying (DBPSK).

The decoder 14 decodes the reception signal of the captured image demodulated by the demodulator 13, and outputs the decoded reception signal to the image processing device 10.

The image processing device 10 acquires the captured image captured by the imaging unit 12 via the demodulator 13 and the decoder 14. The image processing device 10 includes the analysis unit 101 and the control unit 102.

The analysis unit 101 analyzes the captured image captured by the imaging unit 12, demodulated by the demodulator 13, and decoded by the decoder 14. The analysis unit 101 analyzes the captured image and detects an optical signal transmitted by the signal source. The analysis unit 101 reads information on the signal source included in the optical signal on the basis of the detected optical signal. The analysis unit 101 acquires and identifies an attribute of the signal source from the read information of the signal source. The attribute of the signal source is, for example, information on whether the signal source is infrastructure or a vehicle and on a position of the signal source with respect to the own vehicle. The attribute of the signal source may be information such as an ID of the light source, a type of light source, a movement speed of the light source, the position of the light source, a travel direction of the light source, or a state of the light source.

When the signal source is a vehicle, the attribute of the signal source is, for example, information on a position of the vehicle relative to the own vehicle. The information on the position of the vehicle is, for example, information as to whether the vehicle is a preceding vehicle, a left peripheral vehicle, or a right peripheral vehicle relative to the own vehicle. When the signal source is the vehicle, the attribute of the signal source may be information such as a type of vehicle, a vehicle speed, a position of the vehicle, a travel direction, a motion state, and the like.

Further, when the signal source is infrastructure, the attribute of the signal source is information on the position of the infrastructure relative to the own vehicle, and the information on the infrastructure position is, for example, information on a distance from the own vehicle to the infrastructure. When the signal source is the infrastructure, the attribute of the signal source may be a type of infrastructure, coordinates of the infrastructure, a state of the infrastructure, or the like.

The analysis unit 101 calculates a priority according to the attribute of the signal source and sets a region of interest (ROI) on the basis of the calculated priority. The ROI in this embodiment is a region in the captured image including a signal source to be tracked, and is a region including the signal source of the infrastructure or the vehicle described above. In this embodiment, the ROI will be described below as a "third region" with reference to FIG. 5. Details of a method of calculating the priority and a method of setting the ROI on the basis of the priority will be described below with reference to FIGS. 8 to 18, 24, and 25.

Further, the analysis unit 101 detects a lane on the basis of the captured image captured by the imaging unit 12. The detection of the lane can be performed by recognizing a white line (or a yellow line), asphalt, a roadside band, and the like included in the captured image. The analysis unit 101 recognizes the travel lane when a road has one lane on one side. When a road has two or more lanes on one side, the analysis unit 101 recognizes a travel lane and other lanes. The detection of the white line is performed, for example, by binarizing the captured image using a brightness level to detect a boundary of the white line and determining whether a shape based on the detected boundary is a predetermined shape, as described in Japanese Unexamined Patent Publication No. 11-219435.

The control unit 102 controls a scan frequency of a region of the imaging unit 12. The control unit 102 scans the first region of the captured image captured by the imaging unit 12 at a first frequency. The first region is a region in which a possibility of tracking and detecting a light source of infrastructure of which the position is fixed, such as a street lamp or a traffic light that is first detected by the imaging unit 12 (that appears) in a second region to be described below, is high. In this embodiment, the first region is set on an upper side of the captured image. As described above, the imaging unit 12 images a forward view from the own vehicle 1 in the own vehicle 1. If the imaging unit 12 images the forward view from the own vehicle 1, the imaging unit 12 first detects the signal source of the infrastructure such as a street lamp or a traffic light in the second region. However, when the own vehicle 1 approaches infrastructure at a higher position than the position of the own vehicle 1, the elevation angle (described below) with respect to the infrastructure increases. Accordingly, the imaging unit 12 images the infrastructure in the first region. Further, the first frequency is assumed to be lower than the second frequency. The scan frequency in this embodiment is the number of scans that are executed within a predetermined time. The details of the scan frequency will be described below with reference to FIG. 5.

Further, the control unit 102 scans a second region included in the captured image captured by the imaging unit 12 at a second frequency. The second region is a region in which the imaging unit 12 is highly likely to first detect the light source of the moving vehicle such as the other vehicle 2 or the light source of distant infrastructure (a third region is highly likely to appear). Detection and tracking of the signal source is facilitated by setting the second frequency to be higher than the first frequency.

Further, the control unit 102 scans a third region at a third frequency. The third region is a region including the ROI and is a region including a signal source of the infrastructure or a signal source of the vehicle in the captured image captured by the imaging unit 12. The control unit 102 partially scans and tracks the third region at a frequency based on the priority calculated by the analysis unit 101. In the scanning of the third region, surroundings of the signal source may be partially scanned on the basis of the position of the signal source. For example, a movement position predicted by the analysis unit 101 is partially scanned with respect to the position of the signal source last detected by the analysis unit 101. If the signal source is infrastructure, the analysis unit 101 can predict that the third region moves in a predetermined direction with respect to the travel direction and the speed of the own vehicle 1. Specifically, the analysis unit 101 can predict that the third region of the infrastructure moves in a direction away from a center of the captured image. The control unit 102 can achieve improvement of the scan frequency and a reduction in a load of processing of the scanned captured image as compared with a case in which an entire screen of the captured image is scanned, by partially scanning the third region predicted by the analysis unit 101. The partial scan of the third region can be performed by the control unit 102 controlling a vertical scanning circuit 122 and the horizontal scanning circuit 123 to be described with reference to FIG. 3 from the input unit 125 and the input unit 126. However, the partial scan of the third region may be performed by temporarily storing the captured image in the storage unit 18 or the like and the analysis unit 101 reading only a relevant portion of the stored captured image.

The storage unit 18 stores an infrastructure list that is a list of signal sources of the infrastructure, a vehicle list that is a list of signal sources of vehicles, a table for setting a scan frequency based on a priority, and the like. The storage unit 18 can be realized by, for example, a random access memory (RAM), a read only memory (ROM), or a hard disk drive (HDD). The storage unit 18 may store a program or data that is read by a central processing unit (CPU; not illustrated) of the image processing device 10 to realize functions of the image processing device 10. The storage unit 18 can store, for example, a program for realizing functions of the analysis unit 101 and the control unit 102 of the image processing device 10 so that the program can be executed from the CPU.

The display unit 19 is a display device such as a display or a lamp included in the own vehicle 1. The display unit 19 may perform display on the basis of, for example, information included in the signal source. Further, the display unit 19 may be a display unit configured to display a setting in the image processing device 10.

The operation unit 20 is an operation device such as a switch or a joystick included in the own vehicle 1. The operation unit 20 may be an operation unit configured to input a setting in the image processing device 10.

The communication unit 21 performs communication with the data server 9. The communication unit 21 establishes a communication line with the data server 9 based on, for example, wireless communication protocol, transmits information to the data server 9, and acquires information from the data server 9.

The case in which respective functions of the analysis unit 101 and the control unit included in the image processing device 10 are realized by software in FIG. 2 has been described. However, the one or more functions of the image processing device 10 are assumed to be realized by software. Further, each function of the image processing device 10 may be performed by dividing one function into a plurality of functions. Further, each function of the image processing device 10 may be performed by integrating two or more functions into one function.

Figure 3:
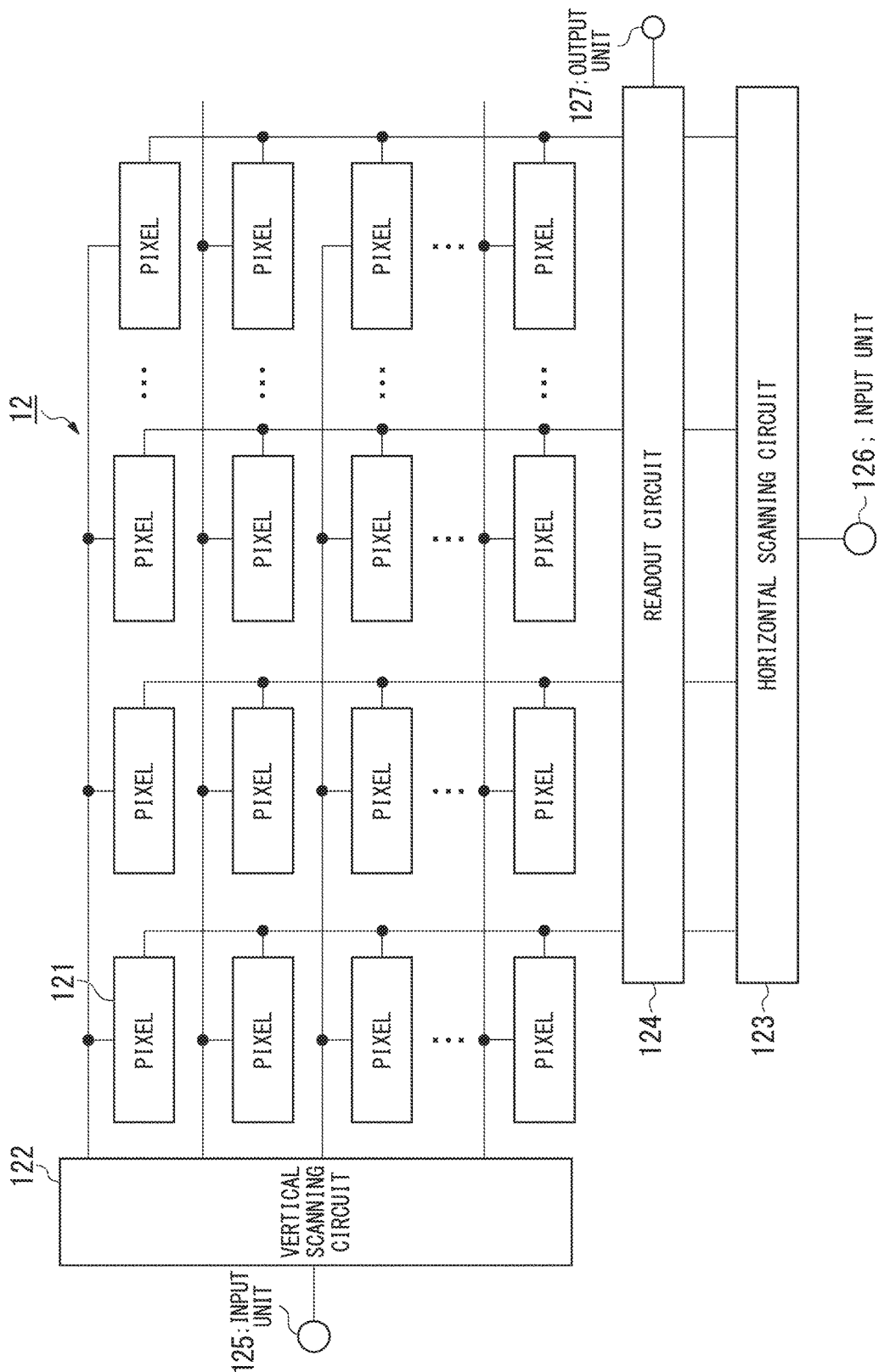
FIG. 3 is a diagram illustrating an example of a configuration of an imaging unit according to an embodiment.

Next, a configuration of the imaging unit 12 will be described with reference to FIG. 3. FIG. 3 is a diagram illustrating an example of a configuration of the imaging unit according to an embodiment.

In FIG. 3, the imaging unit 12 includes a plurality of pixels 121, a vertical scanning circuit 122, a horizontal scanning circuit 123, and a readout circuit 124. An arrangement of pixels 121 is in a two-dimensional matrix form with a predetermined screen resolution (for example, 640×480 or 1280×720). The pixel 121 receives light passing through a lens and generates and accumulates charges. A voltage level according to the charges accumulated in each pixel 121 is read by the readout circuit 124 under control of the vertical scanning circuit 122 and the horizontal scanning circuit 123. The readout circuit 124 outputs the read voltage level from the output unit 127 to the demodulator 13. The vertical scanning circuit 122 includes an input unit 125. The horizontal scanning circuit 123 includes an input unit 126. The control unit 102 outputs a control signal for vertical scan to the input unit 125, and outputs a control signal for horizontal scan to the input unit 126. The control unit 102 can designate a scan range of the captured image captured by the imaging unit 12 according to the control signal for vertical scan and the control signal for horizontal scan.

Figure 4:
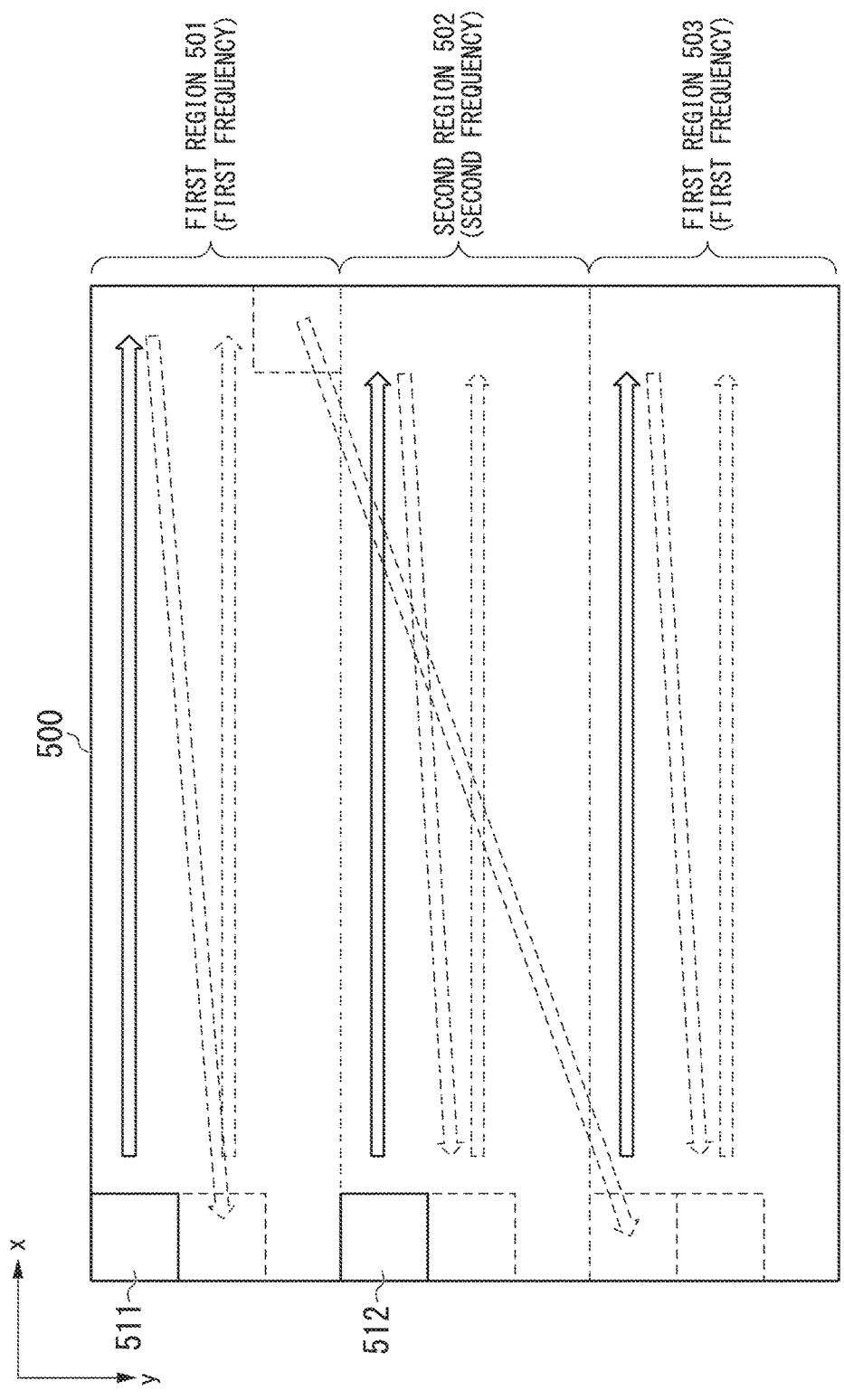
FIG. 4 is a diagram illustrating an example of a region that is set in a captured image and a scan operation according to an embodiment.

Next, a setting of regions in the captured image and a scan operation that are controlled by the control unit 102 will be described with reference to FIG. 4. FIG. 4 is a diagram illustrating an example of regions that are set in the captured image and the scan operation according to the embodiment.

In FIG. 4, a captured image 500 captured by the imaging unit 12 includes a first region 501, a second region 502, and a first region 503. The first region 501 and the first region 503 are regions for which the imaging unit 12 executes scan at a first frequency. The second region 502 is a region for which the imaging unit 12 executes scan at a second frequency. In FIG. 4, a horizontal direction with respect to the paper surface is an x-axis direction, and a direction perpendicular to the x axis is a y-axis direction. Further, in FIG. 4, the captured image 500 is an image illustrated when all the pixels 121 of the imaging unit 12 described in FIG. 3 are aligned in x-axis and y-axis directions.

[Scan of First Region]

In FIG. 4, a rectangular region illustrated on an upper left side of the first region 501 is a readout region 511 in the first region 501. The readout region 511 is a region in which an optical signal from a light source is detected (searched for). The readout region 511 is a region that the imaging unit 12 reads using an array of pixels described with reference to FIG. 3 and is a region of which the number of pixels is, for example, 6×6. The control unit 102 sets an upper left position illustrated in FIG. 4 of the first region 501 as a readout start position, and moves the readout region 511 in a direction indicated by an arrow to scan the first region 501.

When the readout region 511 is moved to the lower right of the first region 501, the control unit 102 moves the readout region 511 to the upper left of the first region 503 to scan the first region 503. When the readout region 511 is moved to the lower right of the first region 503, the control unit 102 moves the readout region 511 to the upper left of the first region 501 again to scan the first region 501.

[Scan of Second Region]

A rectangular region illustrated in the upper left of the second region 502 is a readout region 512 in the second region 502. The control unit 102 sets the upper left position illustrated in FIG. 4 of the second region 502 as a readout start position, and moves the readout region 512 in a direction indicated by an arrow to scan the second region 502. When the readout region 512 moves to the lower right of the second region 502, the control unit 102 moves the readout region 512 to the upper left of the second region 502 again to scan the second region 502.

Here, a scan frequency of the first region can be obtained using a movement distance of the readout region 511 in the first region and a movement speed (clock frequency) of the readout region 511. Similarly, a scan frequency of the second region can be obtained using a movement distance of the readout region 512 in the second region and a movement speed of the readout region 512. In this embodiment, the movement speed of the readout region 511 and the movement speed of the readout region 512 are assumed to be the same. Accordingly, the scan frequency (first frequency) of the first region and the scan frequency (second frequency) of the second region are determined according to the distance in the first region by which the readout region 511 moves and the distance in the second region by which the readout region 512 moves. That is, it is possible to set the scan frequency of the second region to be higher than the scan frequency of the first region by setting the second region to be narrower than the first region.

Although the case in which the movement speed of the readout region 511 and the movement speed of the readout region 512 are the same has been described in this embodiment, the control unit 102 sets a scan frequency of the second region to be higher than that of the first region by setting the movement speed of the readout region 512 to be higher than the movement speed of the readout region 511. A method of setting a high movement speed of the readout region 511 can be realized, for example, by increasing a moving amount of one time by increasing a size of the ROI of the second region or increasing a clock frequency of the oscillator 11 when scan is performed.

In this embodiment, the case in which the first region and the second region are divided into three stages in a vertical direction of the captured image has been shown, but a method of dividing the first region and the second region is not limited thereto. For example, the first region and the second region may be divided according to the distance from the own vehicle 1. Further, the regions may be set to the side or rear of the own vehicle 1, as well as in front of the own vehicle 1. Further, the first region and the second region may be divided in a horizontal direction instead of being divided in a vertical direction of the captured image.

Figure 5:
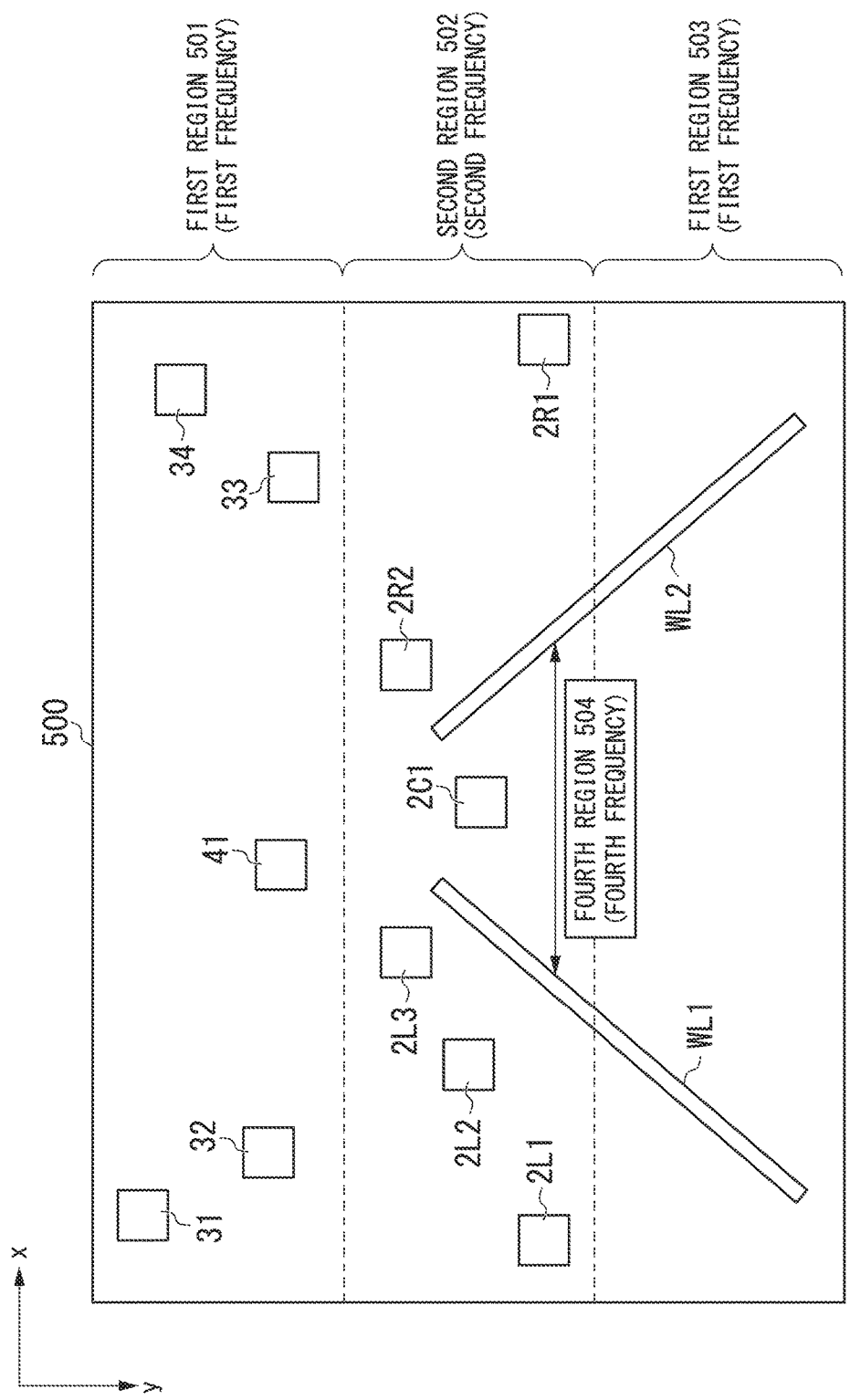
FIG. 5 is a diagram illustrating an example of a region that is set in a captured image and an attribute of a signal source according to an embodiment.

Next, regions to be set in the captured image 500 and attributes of signal sources will be described with reference to FIG. 5. FIG. 5 is a diagram illustrating an example of regions to be set in the captured image and attributes of signal sources according to the embodiment.

In FIG. 5, the captured image 500 includes a first region 501, a second region 502, and a first region 503, as in FIG. 4.

WL1 and WL2 illustrated in FIG. 5 indicate positions of white lines (yellow lines) on a road indicating a lane in which the own vehicle 1 travels, which are recognized by the analysis unit 101. WL1 and WL2 are, for example, solid or broken white or yellow lines. The analysis unit 101 recognizes a region between WL1 and WL2 as a traveling lane in which the own vehicle 1 travels. In this embodiment, the region between WL1 and WL2 is a "fourth region."

2L1, 2L2, 2L3, 2C1, 2R1, and 2R2 of the captured image 500 indicate third regions including signal sources of other vehicles 2 detected by the analysis unit 101. Among other vehicles 2, 2C1 indicates an attribute of the other vehicle 2 that is in the fourth region, that is, is in the same lane as the own vehicle 1, that is, the preceding vehicle. Further, 2L1, 2L2, and 2L3 indicate an attribute of the other vehicle 2 that is not in the fourth region and is in the left lane, that is, the left peripheral vehicle. Further, 2R1 and 2R2 indicate an attribute of the other vehicle 2 that is not in the fourth region and is in the right lane, that is, the right peripheral vehicle. The other vehicles 2 in the respective lanes are numbered from 1 in ascending order of distance from the own vehicle 1.

For example, 2L1 indicates an attribute of the signal source of the vehicle detected by the analysis unit 101, which is closest in the left lane. Similarly, in the left lane, 2L2 indicates an attribute of a second vehicle, and 2L3 indicates an attribute of a third vehicle. In the other traveling vehicle 2, when the vehicle is closer to the own vehicle 1, an influence on the own vehicle 1 is greater according to a motion state such as acceleration, deceleration, and lane change. Accordingly, the light source with an attribute of 2L1 is a tracking target of which a motion state is required to be frequently confirmed in comparison with a light source with an attribute of 2L2. Further, the other vehicle 2 with an attribute of 2C in the own lane (fourth region) is a tracking target of which a motion state is required to be frequently confirmed since an influence of the motion state such as acceleration, deceleration, or lane change is greater than in the other vehicle 2 with an attribute of 2L or 2R in the other lane.

The case in which the fourth region is set in an own lane has been described in this embodiment, but, setting of the fourth region is not limited thereto. For example, the analysis unit 101 may set the fourth region at a distance from the own vehicle 1. The attribute in a case in which the fourth region is set at a distance from the own vehicle 1 may be determined according to the distance from the own vehicle 1.

In the captured image 500, 31, 32, 33, and 34 indicate a third region including a signal source of a street lamp that is a type of infrastructure detected by the analysis unit 101. Further, 41 indicates a third region including a signal source of a traffic light that is a type of infrastructure detected by the analysis unit 101. The analysis unit 101 detects 31, 32, 33, 34, and 41 in the first detection region.

Figure 6:
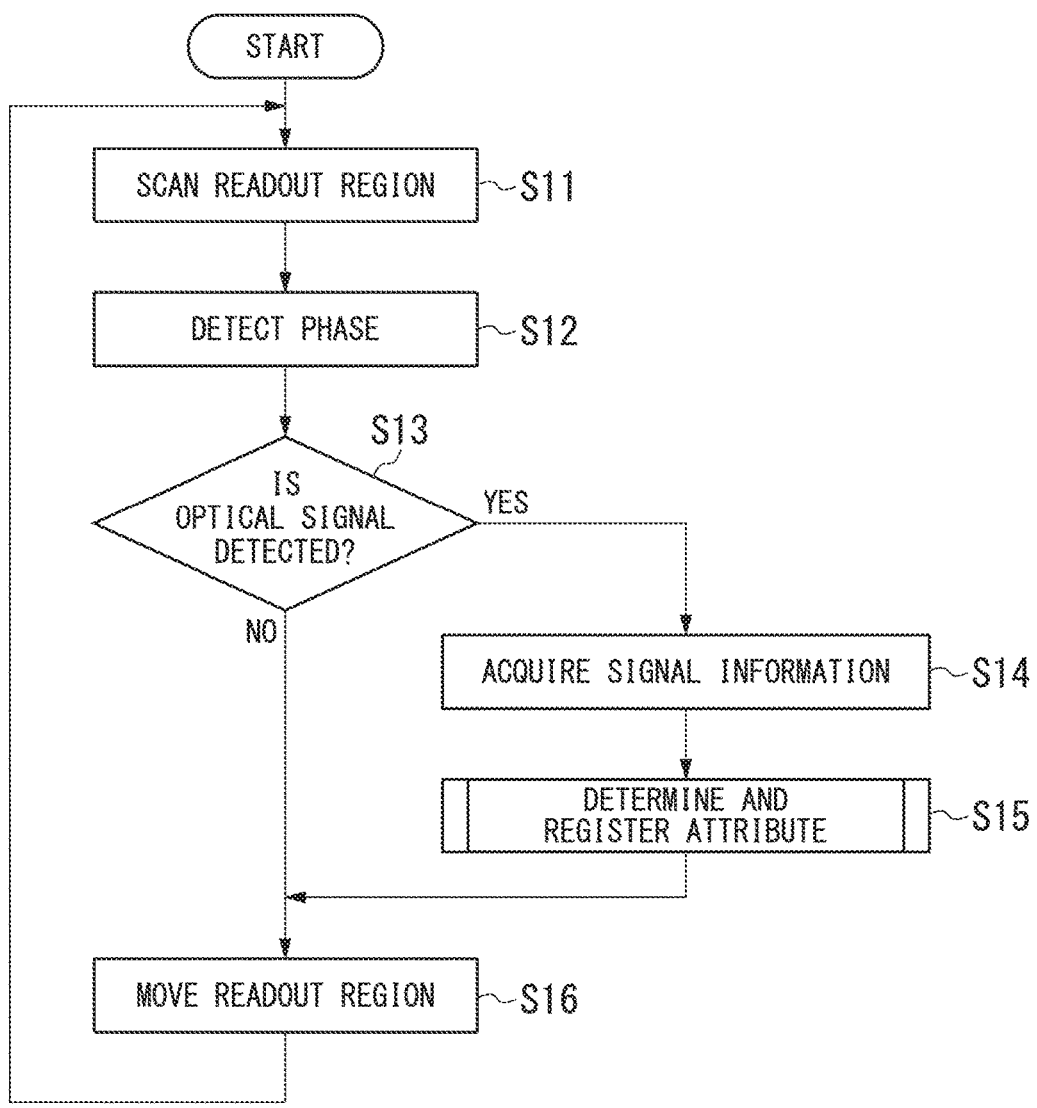
FIG. 6 is a flowchart illustrating an example of image processing according to an embodiment.
Figure 7:
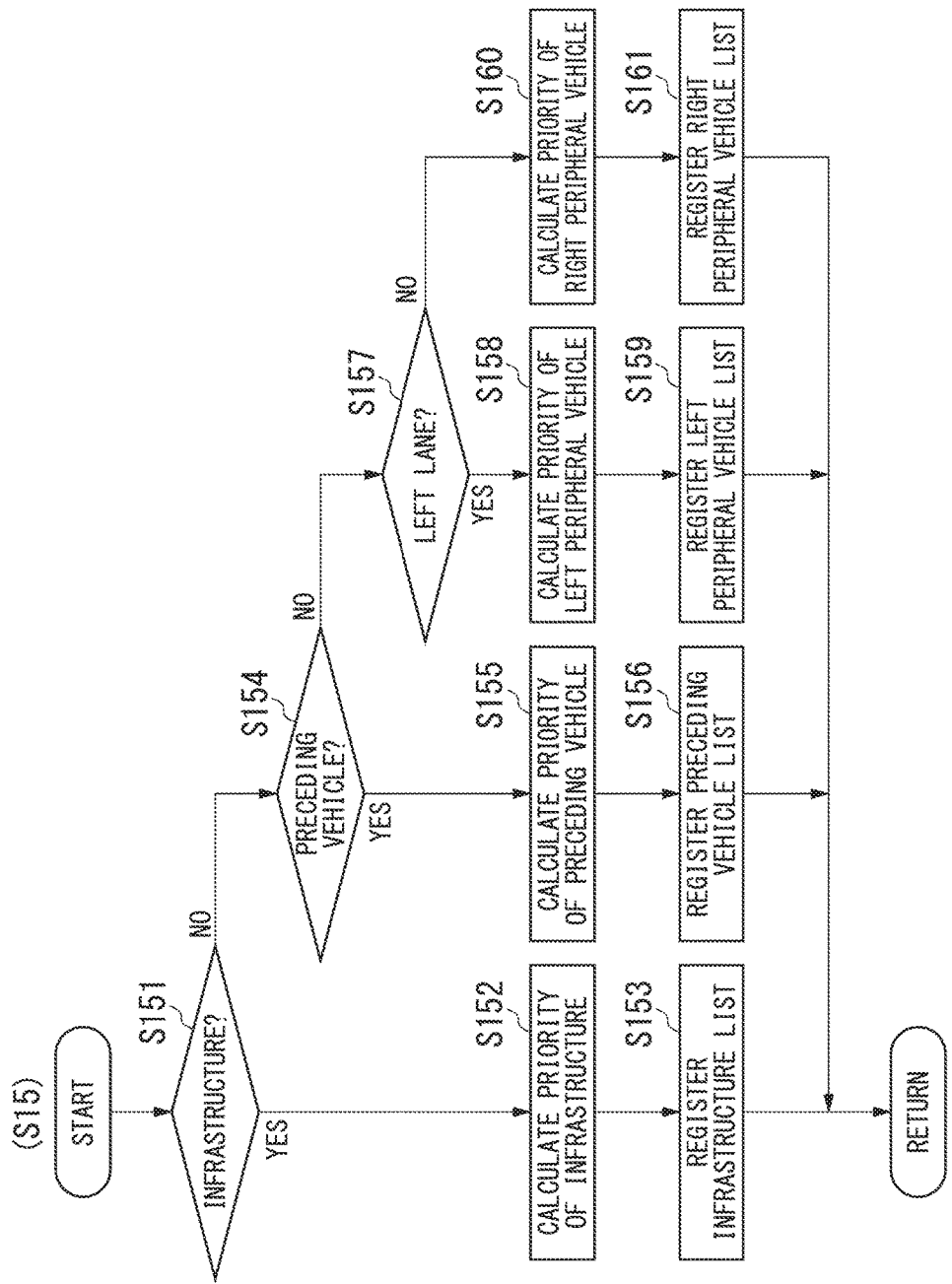
FIG. 7 is a flowchart illustrating an example of an attribute determination and registration process in image processing according to an embodiment.

Next, an operation of the image processing will be described with reference to FIGS. 6 and 7. FIG. 6 is a flowchart illustrating an example of the operation of the image processing according to the embodiment. FIG. 7 is a flowchart illustrating an example of an attribute determination and a registration process in the image processing according to the embodiment. Operations shown in the flowcharts of FIGS. 6 to 20 are assumed to be executed by the image processing device 10.

In FIG. 6, the image processing device 10 scans a readout region (step S11).

The readout region is a first region or a second region. After step S11 is executed, the image processing device 10 executes phase detection (step S12). The image processing device 10 detects whether an optical signal of which a phase is modulated by a modulator is present in the scanned region. After executing the process of step S12, the image processing device 10 determines whether the optical signal is detected (step S13).

When it is determined that the optical signal is detected (step S13: YES), the image processing device 10 acquires information included in the optical signal (step S14). After executing the process of step S14, the image processing device 10 performs a determination and registration process of determining an attribute of the signal source and registering the determined attribute (step S15). The attribute determination process of step S15 will be described below with reference to FIG. 7.

If the image processing device 10 determines in the process of step S13 that the optical signal is not detected (step S13: NO) or after the image processing device 10 executes the process of step S15, the image processing device 10 moves the readout region (step S16). The movement of the readout region may be executed by sequentially scanning the captured image 500 in a horizontal direction, as described in FIG. 4.

Next, the attribute determination process of step S15 in FIG. 6 will be described with reference to FIG. 7. In FIG. 7, the image processing device 10 determines whether or not the signal source is infrastructure on the basis of the attribute acquired from the optical signal (step S151). If the image processing device 10 determines that the signal source is infrastructure (step S151: YES), the image processing device 10 calculates a priority of the infrastructure (step S152). A method of calculating the priority will be described below with reference to FIG. 15. After executing the process of step S152, the image processing device 10 registers the signal source (light source) in an infrastructure list (step S153). Details of the infrastructure list will be described below with reference to FIG. 21. On the other hand, if the image processing device 10 determines that the signal source is not infrastructure (step S151: NO), the image processing device 10 determines whether the signal source is a preceding vehicle (which may be referred to as a preceding car) (step S154). The determination as to whether the signal source is a preceding vehicle may be performed according to whether or not a third region of the preceding vehicle is included in a fourth region or may be performed from a lane in which the preceding vehicle is located through query to the data server. If the image processing device 10 determines that the signal source is a preceding vehicle (step S154: YES), the image processing device 10 calculates a priority of the preceding vehicle (step S155). After executing the process of step S155, the image processing device 10 registers the signal source (light source) as the preceding vehicle in a vehicle list (step S156). Details of the vehicle list will be described below with reference to FIG. 22. The vehicle list includes a preceding vehicle list, a left peripheral vehicle list, and a right peripheral vehicle list.

On the other hand, if the image processing device 10 determines that the signal source is not a preceding vehicle (step S154: NO), the image processing device 10 determines whether the signal source is a left peripheral vehicle in a left lane (step S157). If the image processing device 10 determines that the signal source is a left peripheral vehicle (step S157: YES), the image processing device 10 calculates a priority of the left peripheral vehicle (step S158). After executing the process of step S158, the image processing device 10 registers the signal source as the left peripheral vehicle in the vehicle list (step S159). On the other hand, if the image processing device 10 determines that the signal source is not a left peripheral vehicle (step S157: NO), the image processing device 10 calculates a priority of the right peripheral vehicle (step S160). After executing the process of step S160, the image processing device 10 registers the signal source as a right peripheral vehicle in the vehicle list (step S161).

After executing the processes of steps S153, S156, S159 or S161, the image processing device 10 ends the process in the flowchart of FIG. 7.

Figure 8:
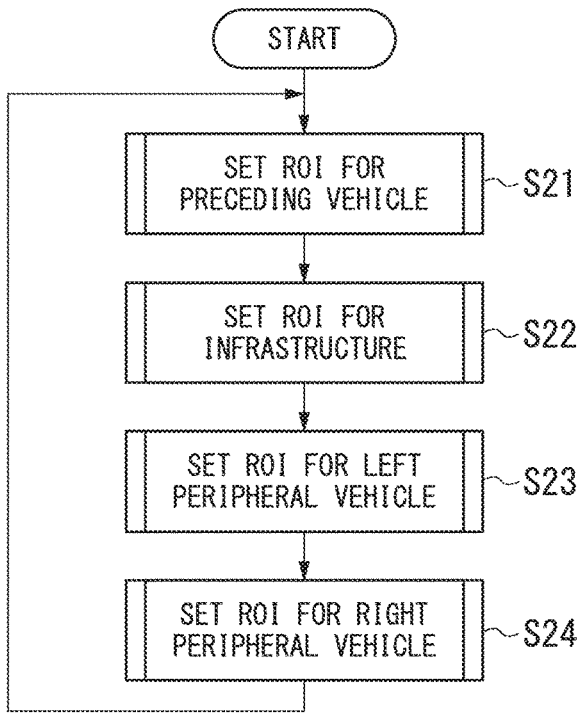
FIG. 8 is a flowchart illustrating an example of an ROI setting process in image processing according to an embodiment.
Figure 9:
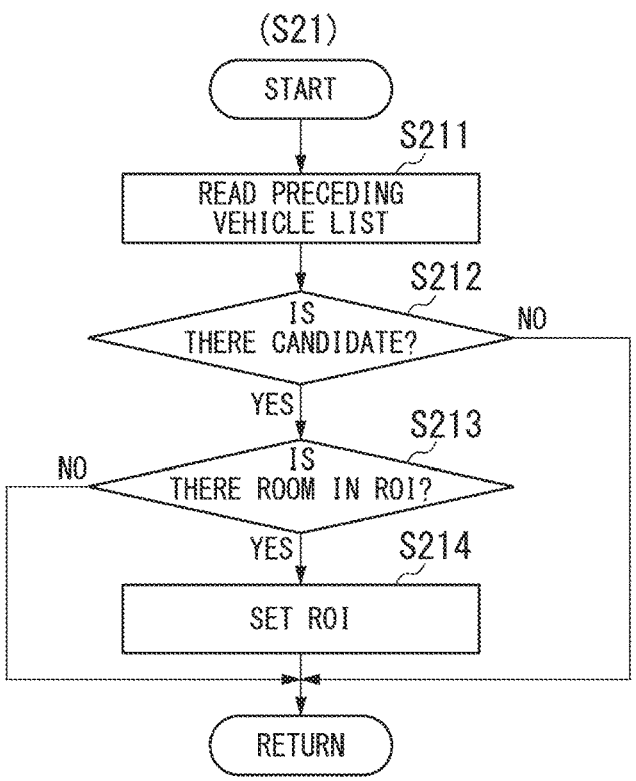
FIG. 9 is a flowchart illustrating an example of an ROI setting process of a preceding vehicle in image processing according to an embodiment.
Figure 10:
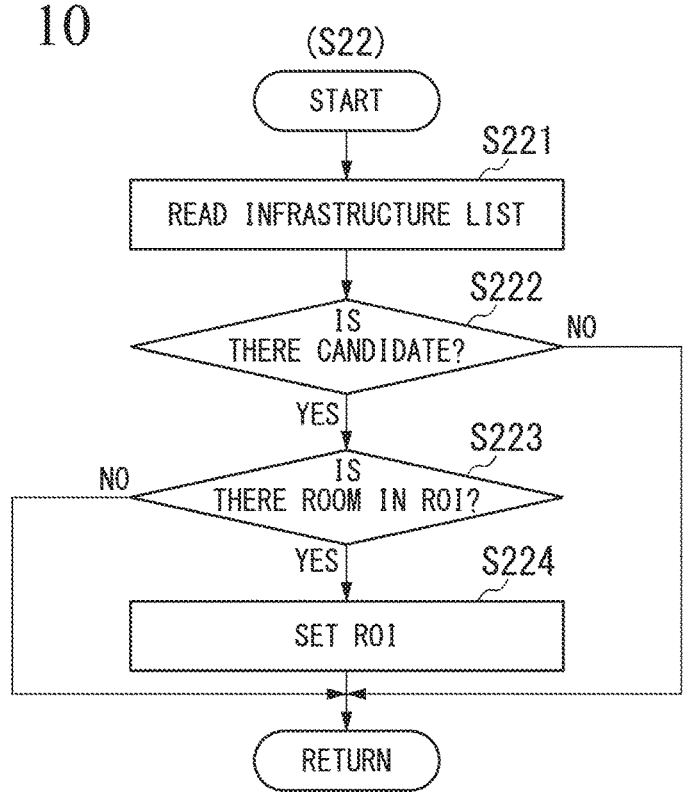
FIG. 10 is a flowchart illustrating an example of an ROI setting process of an infrastructure in image processing according to an embodiment.
Figure 11:
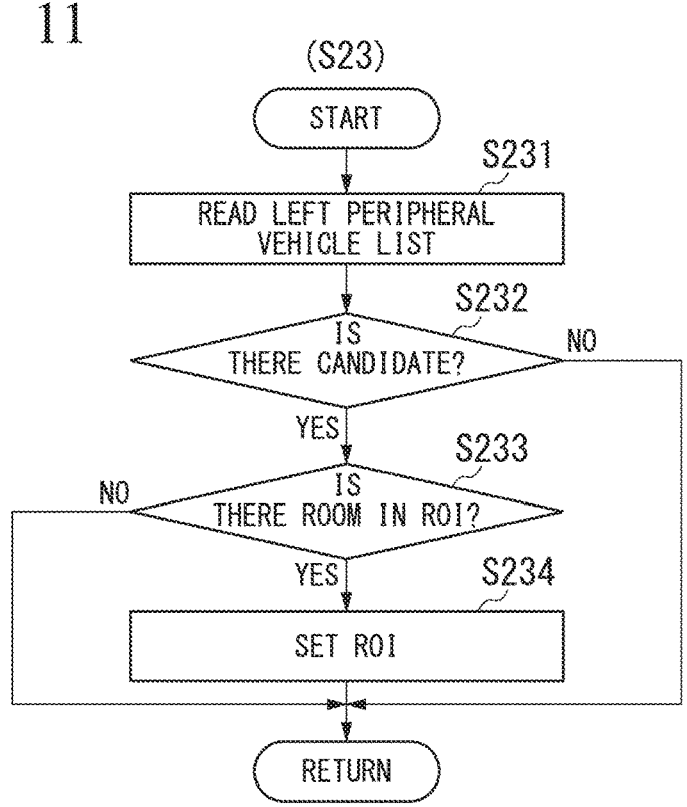
FIG. 11 is a flowchart illustrating an example of an ROI setting process of a left peripheral vehicle in image processing according to an embodiment.
Figure 12:
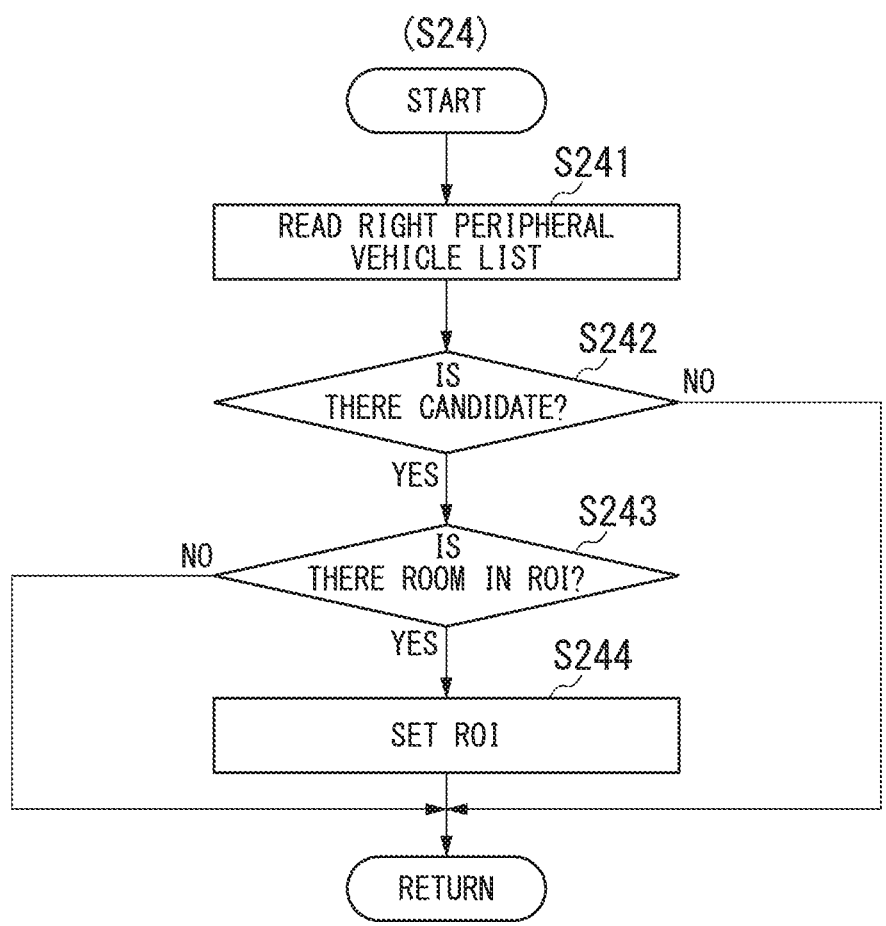
FIG. 12 is a flowchart illustrating an example of an ROI setting process of a right peripheral vehicle in image processing according to an embodiment.

Next, an ROI setting process will be described with reference to FIGS. 8 to 12. FIG. 8 is a flowchart illustrating an example of the ROI setting process in image processing according to the embodiment. FIG. 9 is a flowchart illustrating an example of the ROI setting process for a preceding vehicle in the image processing according to the embodiment. FIG. 10 is a flowchart illustrating an example of the ROI setting process for infrastructure in the image processing according to the embodiment. FIG. 11 is a flowchart illustrating an example of the ROI setting process for a left peripheral vehicle in the image processing according to the embodiment. FIG. 12 is a flowchart illustrating an example of the ROI setting process for a right peripheral vehicle in the image processing according to the embodiment. The ROI setting process illustrated in FIGS. 8 to 12 can be performed asynchronously to the processes in FIGS. 6 and 7. That is, in this embodiment, it is assumed that the signal source registration process and the ROI setting process are independently performed.

In FIG. 8, the image processing device 10 sets the ROI for the preceding vehicle (step S21). After executing the process of step S21, the image processing device 10 sets the ROI for the infrastructure (step S22). After executing the process of step S22, the image processing device 10 sets the ROI for the left peripheral vehicle (step S23). After executing the process of step S23, the image processing device 10 sets the ROI for the right peripheral vehicle (step S24). After executing the process of step S24, the image processing device 10 returns to the process of step S21 to repeatedly execute the processes of steps S21 to S24.

FIG. 9 is a subroutine of a process of setting an ROI for the preceding vehicle in step S21 in FIG. 8. In FIG. 9, the image processing device 10 reads the preceding vehicle list (step S211). After executing the process of step S211, the image processing device 10 determines whether or not there is a candidate for the ROI in the preceding vehicle list (step S212). If the image processing device 10 determines that there is no candidate for the ROI in the preceding vehicle list (step S212: NO), the image processing device 10 ends the process of step S21.

On the other hand, if the image processing device 10 determines that there is a candidate for the ROI in the preceding vehicle list (step S212: YES), the image processing device 10 determines whether there is room in the ROI (step S213). In the image processing device 10, the maximum number of signal sources to be scanned (read) at a time in the ROI can be set in advance. The determination of whether there is room in the ROI can be performed according to whether the number of the detected signal sources reaches a maximum value that can be set. If the image processing device 10 determines that there is room in the ROI (step S213: YES), the image processing device 10 sets the candidate for the ROI read from the list in the ROI (step S214), and ends the process of step S21. On the other hand, if the image processing device 10 determines that there is no room in the ROI (step S213: NO), the image processing device 10 does not set the candidate for the ROI read from the list in the ROI, and ends the process of step S21.

FIG. 10 is a subroutine of a process of setting an ROI for infrastructure in step S22 of FIG. 8. In FIG. 10, the image processing device 10 reads an infrastructure list (step S221). After executing the process of step S221, the image processing device 10 determines whether or not there is a candidate for the ROI in the infrastructure list (step S222). If the image processing device 10 determines that there is no candidate for an ROI in the infrastructure list (step S222: NO), the image processing device 10 ends the process of step S22.

On the other hand, if the image processing device 10 determines that there is a candidate for the ROI in the infrastructure list (step S222: YES), the image processing device 10 determines whether there is room in the ROI (step S223). If the image processing device 10 determines that there is room in the ROI (step S223: YES), the image processing device 10 sets the candidate for the ROI read from the list in the ROI (step S224), and ends the process of step S22. On the other hand, if the image processing device 10 determines that there is no room in the ROI (step S223: NO), the image processing device 10 does not set the candidate for the ROI read from the list in the ROI, and ends the process of step S22.

FIG. 11 is a subroutine of the process of setting an ROI for a left peripheral vehicle in step S23 of FIG. 8. In FIG. 11, the image processing device 10 reads the left peripheral vehicle list (step S231). After executing the process of step S231, the image processing device 10 determines whether or not there is a candidate for the ROI in the left peripheral vehicle list (step S232). If the image processing device 10 determines that there is no candidate for the ROI in the left peripheral vehicle list (step S232: NO), the image processing device 10 ends the process of step S23.

On the other hand, if the image processing device 10 determines that there is a candidate for the ROI in the left peripheral vehicle list (step S232: YES), the image processing device 10 determines whether there is room in the ROI (step S233). If the image processing device 10 determines that there is room in the ROI (step S233: YES), the image processing device 10 sets the candidate for the ROI read from the list in the ROI (step S234), and ends the process of step S23. On the other hand, if the image processing device 10 determines that there is no room in the ROI (step S233: NO), the image processing device 10 does not set the candidate for the ROI read from the list in the ROI, and ends the process of step S23.

FIG. 12 is a subroutine of a process of setting an ROI for a right peripheral vehicle in step S24 of FIG. 8. In FIG. 12, the image processing device 10 reads a right peripheral vehicle list (step S241). After executing the process of step S241, the image processing device 10 determines whether or not there is a candidate for the ROI in the right peripheral vehicle list (step S242). If the image processing device 10 determines that there is no candidate for the ROI in the right peripheral vehicle list (step S242: NO), the image processing device 10 ends the process of step S24.

On the other hand, if the image processing device 10 determines that there is a candidate for the ROI in the right peripheral vehicle list (step S242: YES), the image processing device 10 determines whether there is room in the ROI (step S243). If the image processing device 10 determines that there is room in the ROI (step S243: YES), the image processing device 10 sets the candidate for the ROI read from the list in the ROI (step S244), and ends the process of step S24. On the other hand, if the image processing device 10 determines that there is no room in the ROI (step S243: NO), the image processing device 10 does not set the candidate for the ROI read from the list in the ROI, and ends the process of step S24.

The case in which the ROI is set to a predetermined maximum value for each of the preceding vehicle, the infrastructure, the left peripheral vehicle, and the right peripheral vehicle has been described in FIGS. 8 to 12, but a method of setting the ROI is not limited thereto. For example, a priority may be set for all of the preceding vehicle, the infrastructure, the left peripheral vehicle, and the right peripheral vehicle, and the infrastructure, and the ROI may be selected on the basis of the priority.

Next, a process of updating the ROI set in FIGS. 8 to 12 will be described with reference to FIG. 13.

Figure 13:
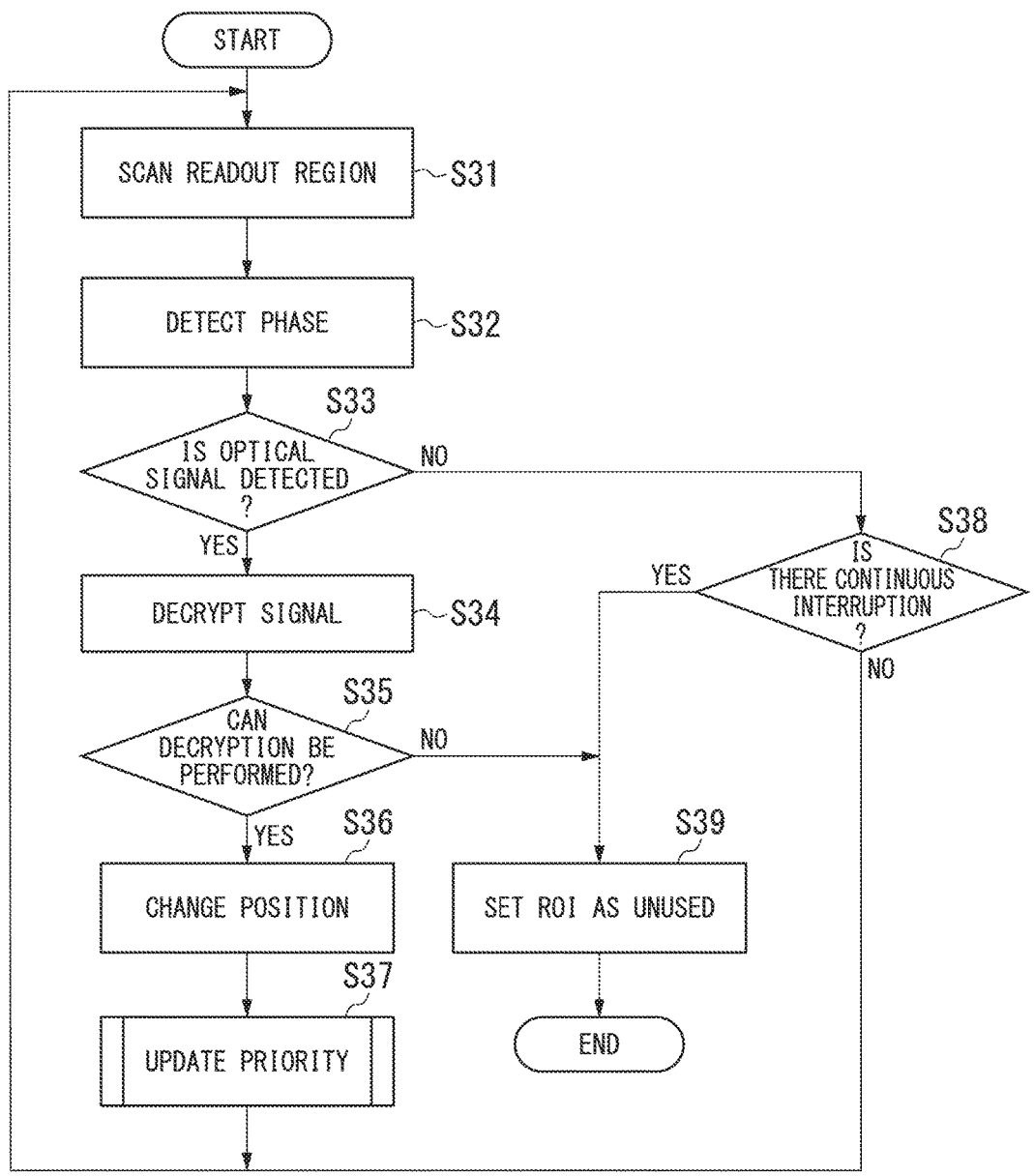
FIG. 13 is a flowchart illustrating an example of an ROI updating process in image processing according to an embodiment.

FIG. 13 is a flowchart illustrating an example of the ROI updating process in the image processing according to the embodiment. In FIG. 13, the image processing device 10 updates the priority for the detected signal source to update the setting of the ROI. When the image processing device 10 updates the ROI, the image processing device 10 scans (reads) the signal source and sets the signal source of the ROI as unused when image processing device 10 cannot track the signal source or has read a signal a certain number of times. The ROI updating process illustrated in FIG. 13 may be performed asynchronously with the process in FIGS. 6 and 7 or the ROI setting process in FIGS. 8 to 12. That is, in this embodiment, the signal source registration process, the ROI setting process, and the ROI updating process are assumed to be independently performed.

Since processes of steps S31 to S33 in FIG. 13 are same as the processes of steps S11 to S13 in FIG. 6, description thereof will be omitted. When the image processing device 10 determines that the optical signal is detected (step S33: YES), the image processing device 10 decrypts information included in the optical signal (step S34). The decryption of the information included in the optical signal fails, for example, when the information is not correctly acquired due to noise or the like. After executing the process of step S34, the image processing device 10 determines whether the decryption is correctly performed (step S35). If the decryption is correctly performed and the number of times of decryption is determined to be equal to or less than a predetermined number of times (step S35: YES), the image processing device 10 changes the position (step S36). The position change is a process of changing the position of the ROI on an imaging screen described with reference to FIG. 5. After executing the process of step S36, the image processing device 10 executes a priority updating process of step S37 (step S37) and returns to step S31. Details of the priority updating process will be described below with reference to FIG. 14.

On the other hand, if the image processing device 10 determines that the optical signal is not detected in the process of step S33 (step S33: NO), the image processing device 10 determines whether or not the optical signal cannot be continuously detected and are interrupted (step S38). If the image processing device 10 determines that the optical signal is not interrupted (step S38: NO), the image processing device 10 returns to step S31.

On the other hand, if the image processing device 10 determines that the optical signal is interrupted (step S38: YES), or if the image processing device 10 determines that the number of times of decryption exceeds a predetermined number of times or the decryption cannot be correctly performed in the process of step S35 (step S35: NO), the image processing device 10 sets the ROI as unused (step S39). By setting the ROI as unused, it is possible to delete the signal source that cannot be detected from the list according to the number of times the signal source cannot be detected or the relative distance. After executing the process of step S39, the image processing device 10 ends the ROI updating process shown in the flowchart of FIG. 13. That is, the image processing device 10 repeats the ROI updating process in FIG. 13 for all the detected signal sources until the ROI is set as unused.

Figure 14:
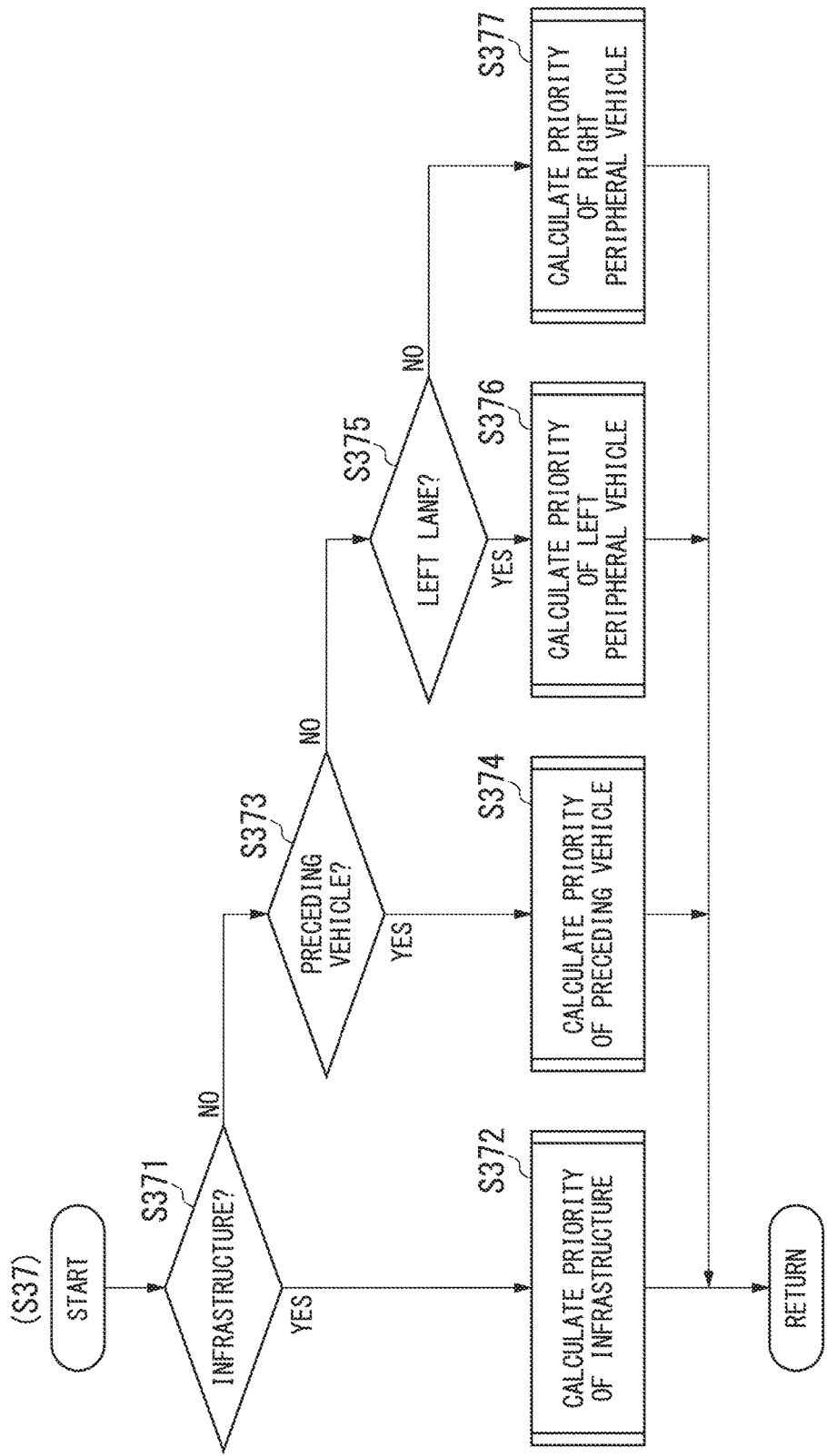
FIG. 14 is a flowchart illustrating an example of an ROI priority updating process in image processing according to an embodiment.

Next, the ROI priority update process in step S37 of FIG. 13 will be described with reference to FIG. 14. FIG. 14 is a flowchart illustrating an example of the ROI priority update process in the image processing according to the embodiment.

In FIG. 14, the image processing device 10 determines whether the signal source is infrastructure on the basis of the attribute acquired from the optical signal (step S371). If the image processing device 10 determines that the attribute of the signal source is infrastructure (step S171: YES), the image processing device 10 recalculates the priority of the infrastructure (step S372). On the other hand, if the image processing device 10 determines that the attribute of the signal source is not infrastructure (step S371: NO), the image processing device 10 determines whether the attribute of the signal source is a preceding vehicle (step S373). The determination as to whether the attribute of the signal source is a preceding vehicle can be performed according to whether a third region of the preceding vehicle is included in a fourth region.

If the image processing device 10 determines that the attribute of the signal source is a preceding vehicle (step S373: YES), the image processing device 10 recalculates the priority of the preceding vehicle (step S374).

On the other hand, if the image processing device 10 determines that the attribute of the signal source is not a preceding vehicle (step S373: NO), the image processing device 10 determines whether the attribute of the signal source is a left peripheral vehicle in the left lane (step S375). If the image processing device 10 determines that the attribute of the signal source is a left peripheral vehicle (step S375: YES), the image processing device 10 recalculates the priority of the left peripheral vehicle (step S376).

On the other hand, if the image processing device 10 determines that the attribute of the signal source is not a left peripheral vehicle (step S375: NO), the image processing device 10 determines that the attribute of the signal source is a right peripheral vehicle and recalculates the priority of the right peripheral vehicle (step S377).

After executing the process of steps S372, S374, S376, or S377, the image processing device 10 ends the process in the flowchart in FIG. 14.

Next, the ROI priority calculation process in steps S372, S374, S376, and S377 in FIG. 14 will be described with reference to FIGS. 15 to 18.

Figure 15:
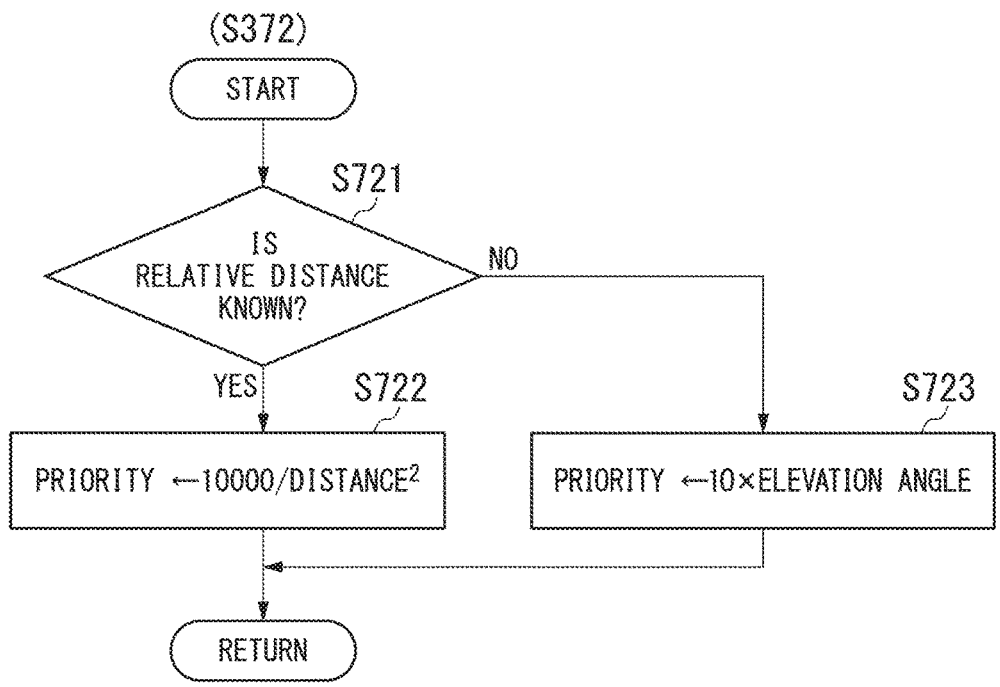
FIG. 15 is a flowchart illustrating an example of an ROI priority calculation process of an infrastructure in image processing according to an embodiment.

FIG. 15 is a flowchart illustrating an example of an ROI priority calculation process of the infrastructure in the image processing according to the embodiment. In FIG. 15, the image processing device 10 determines whether a relative distance between the own vehicle 1 and the infrastructure is known (step S721). A method of calculating the relative distance between the own vehicle 1 and the infrastructure will be described below with reference to FIG. 20. If the image processing device 10 determines that the relative distance is known (step S721: YES), the image processing device 10 sets the priority to a value that is in inverse proportion to a square of the relative distance (step S722). For example, the priority is calculated as in Equation (1).

$$\text{Priority} = 10000/(\text{relative distance (m)})^2 \quad (1)$$

In Equation (1), for example, when the distance between the own vehicle 1 and the street lamp 3 is 100 m, the priority is 1.

On the other hand, if the image processing device 10 determines that the relative distance is not known (step S721: NO), the image processing device 10 sets the priority to a value proportional to an elevation angle (step S723). The elevation angle is an elevation angle from the imaging unit 12 to the infrastructure. The image processing device 10 calculates the elevation angle from camera calibration data of the imaging unit 12 to be described below. The priority is calculated as in, for example, Equation (2).

$$\text{Priority} = 10 \times \text{elevation angle (rad)} \quad (2)$$

In Equation (2), for example, when the elevation is 0.1 (rad) (≈5.73°), the priority is 1. In the signal source of the infrastructure such as a street lamp or a traffic light at a higher position than the own vehicle 1, the elevation angle increases when the own vehicle 1 approaches the infrastructure. Therefore, in FIG. 15, the image processing device 10 replaces the elevation angle with the relative distance to calculate a priority when the relative distance is not known.

After the process of step S722 or S723 is executed, the image processing device 10 ends the process of step S372.

Figure 16:
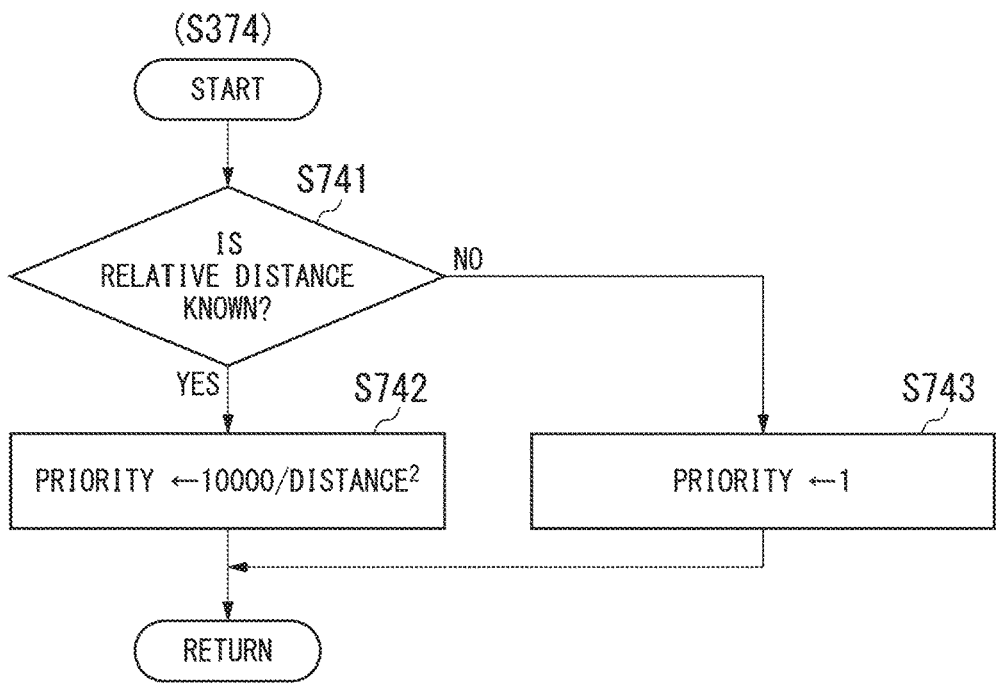
FIG. 16 is a flowchart illustrating an example of an ROI priority calculation process of a preceding vehicle in image processing according to an embodiment.

FIG. 16 is a flowchart illustrating an example of an ROI priority calculation process of the preceding vehicle in the image processing according to the embodiment. In FIG. 16, the image processing device 10 determines whether a relative distance between the own vehicle 1 and the preceding vehicle 2C is known (step S741). A method of calculating the relative distance between the own vehicle 1 and the preceding vehicle 2C will be described below with reference to FIG. 20. If the image processing device 10 determines that the relative distance is known (step S741: YES), the image processing device 10 sets the priority as a value that is in inverse proportion to a square of the relative distance (step S742). For example, the priority is calculated using Equation (1).

$$\text{Priority} = 10000/(\text{relative distance (m)})^2 \quad (1)$$

In Equation (1), for example, when the distance between the own vehicle 1 and the preceding vehicle 2C is at 50 m, the priority is four.

On the other hand, if the image processing device 10 determines that the relative distance is not known (step S741: NO), the image processing device 10 sets the priority to 1 (step S743). After executing the process of step S742 or S743, the image processing device 10 ends the process of step S374.

Figure 17:
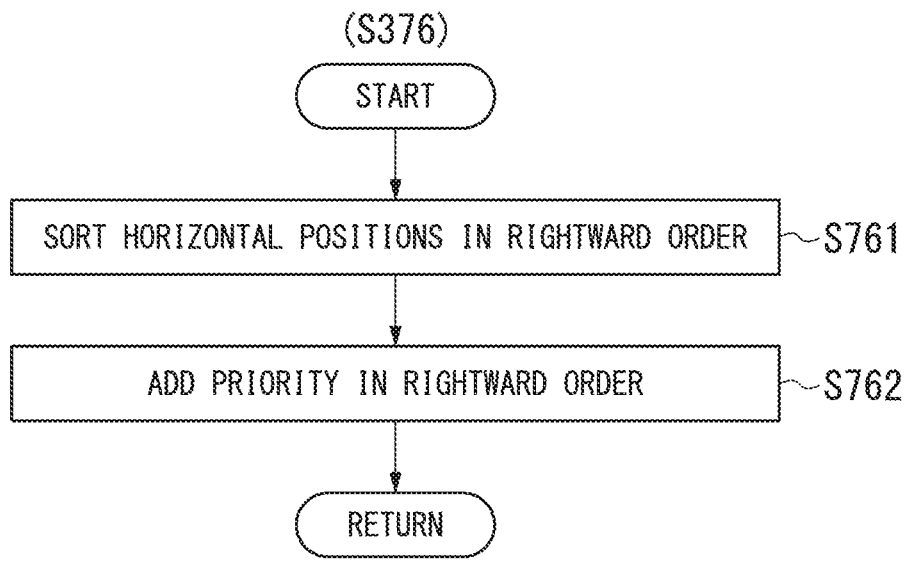
FIG. 17 is a flowchart illustrating an example of an ROI priority calculation process of a left peripheral vehicle in image processing according to an embodiment.

FIG. 17 is a flowchart illustrating an example of an ROI priority calculation process of left peripheral vehicles in the image processing according to the embodiment. In FIG. 17, the image processing device 10 sorts horizontal positions of left peripheral vehicles in a rightward order (step S761). For example, the left peripheral vehicles 2L1, 2L2, and 2L3 illustrated in FIG. 5 are sorted in a rightward order, 2L3→2L2→2L1. After executing the process of step S761, the image processing device 10 adds the priority in a rightward order (step S762). Therefore, the respective priorities are 2L3=1, 2L2=2, and 2L1=3. That is, in the method of calculating the priority illustrated in FIG. 17, the priorities of the other vehicles detected in the left lane increase by one in descending order of distance.

Figure 18:
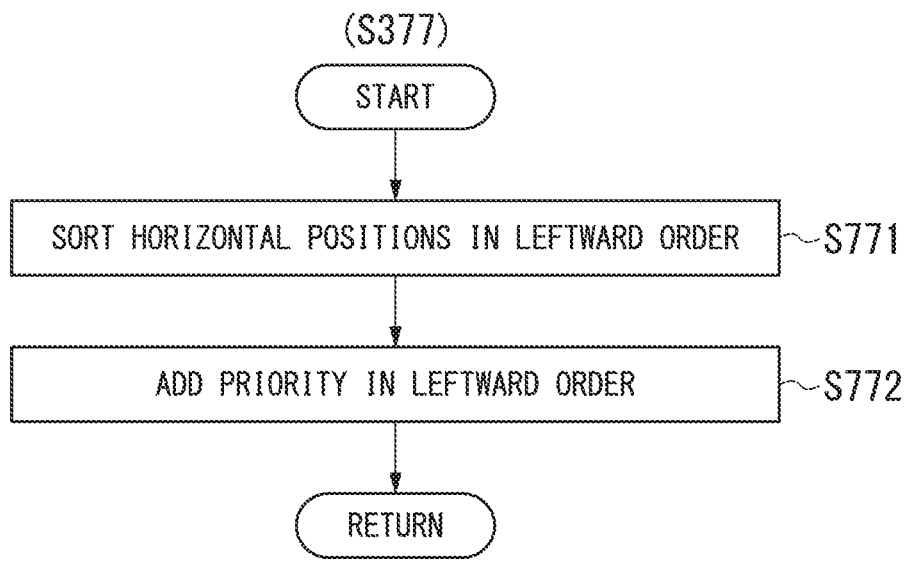
FIG. 18 is a flowchart illustrating an example of an ROI priority calculation process of a right peripheral vehicle in image processing according to an embodiment.

FIG. 18 is a flowchart illustrating an example of an ROI priority calculation process of right peripheral vehicles in the image processing according to the embodiment. In FIG. 18, the image processing device 10 sorts horizontal positions of the right peripheral vehicles in a leftward order (step S771). For example, right peripheral vehicles 2R1 and 2R2 illustrated in FIG. 5 are sorted in a leftward order, 2R2→2R1. After executing the process of step S771, the image processing device 10 adds the priority in a leftward order (step S772). Therefore, the respective priorities are 2R2=1 and 2R1=2. That is, in the method of calculating the priority illustrated in FIG. 18, the priorities of other vehicles detected in the right lane increase by one in descending order of distance.

Figure 19:
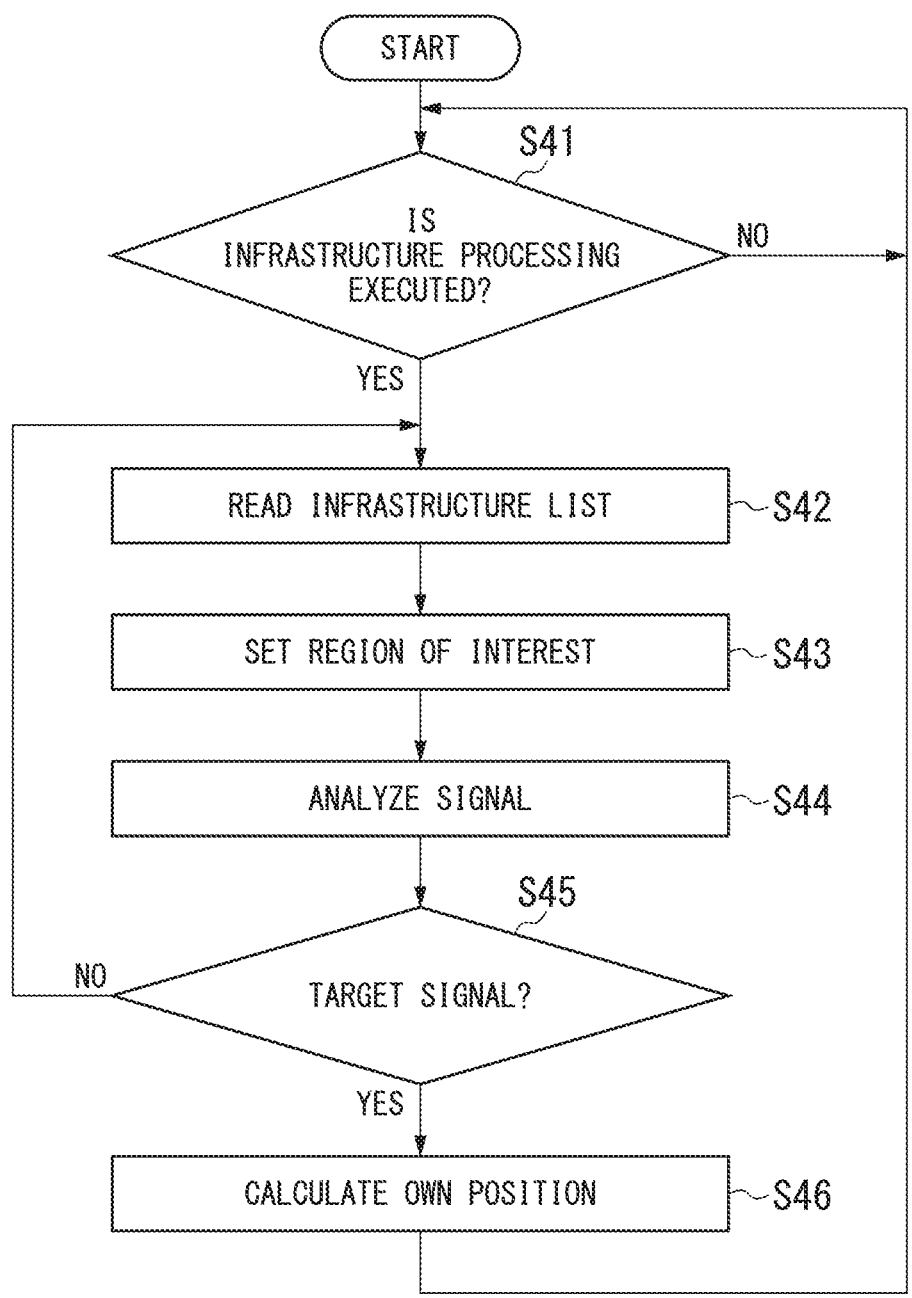
FIG. 19 is a flowchart illustrating an example of infrastructure processing in image processing according to an embodiment.

Next, infrastructure processing will be described with reference to FIG. 19. FIG. 19 is a flowchart illustrating an example of the infrastructure processing in the image processing according to the embodiment. In FIG. 19, a process of calculating a position of the own vehicle 1 on the basis of the information obtained from the optical signal of the infrastructure is illustrated. The processing in FIG. 19 and the processing in FIG. 20 may be performed at an arbitrary timing asynchronously with the timing of the processing in FIG. 6 or the like.

In FIG. 19, the image processing device 10 determines whether the infrastructure processing is executed (step S41). Whether the infrastructure processing is executed may be determined according to, for example, whether there is an operation from an operator. If the image processing device 10 determines that the infrastructure processing is not executed (step S41: NO), the image processing device 10 repeats the process of step S41 until it is determined that the processing is executed and waits.

On the other hand, when the image processing device 10 determines that the infrastructure processing is executed (step S41: YES), the image processing device 10 reads the infrastructure list (step S42). After executing the process of step S42, the image processing device 10 sets the ROI on the basis of the priority of the read signal source list (step S43). Here, the number of ROIs to be set is the number that is used when the own position in step S46 is calculated. In resection to be described below, three or more ROIs are used. After executing step S43, the image processing device 10 analyzes the information included in the optical signal (step S44). For the analysis of the information, for example, information such as an ID of the signal source in which the ROI is set or coordinates is analyzed. After executing the process of step S44, the image processing device 10 determines whether a signal obtained by analyzing the information is a target signal (step S45). In the process of FIG. 19, since a purpose of the process is calculation of the own position, the determination can be performed according to whether or not information necessary for calculation of the own position has been acquired. If the signal is determined not to be a target signal (step S45: NO), the image processing device 10 returns to the process of step S42 to execute readout of the infrastructure list again.

On the other hand, if the image processing device 10 determines that the signal is a target signal (step S45: YES), the image processing device 10 calculates the own position (step S46). The calculation of the own position can be performed using resection. The resection is a method of calculating a position that is used in surveying. In the resection, there is a method of collimating three or more known points from the own position to be calculated, to determine the position. For example, the own position can be calculated by acquiring coordinate information of the infrastructure of three or more points and calculating an angle at the time of collimation from the imaging unit 12. The image processing device 10 calculates the angle at the time of collimation from the imaging unit 12 using the position of the captured image that has been captured and the camera calibration data of the imaging unit 12. The camera calibration is work of associating the coordinate position in a captured image with the direction of an incident ray in advance. The camera calibration data is coordinate information on the captured image and information on polar coordinates (a pan angle and a tilt angle) in a direction of the incident ray corresponding thereto, which have been associated through the camera calibration. For the camera calibration, for example, a scheme disclosed in Japanese Unexamined Patent Publication Application, First No. 2004-48399 or Japanese Unexamined Patent Publication Application, First No. 2004-30931 is used. After executing the process of step S46, the image processing device 10 executes the process of step S51 again.

Figure 20:
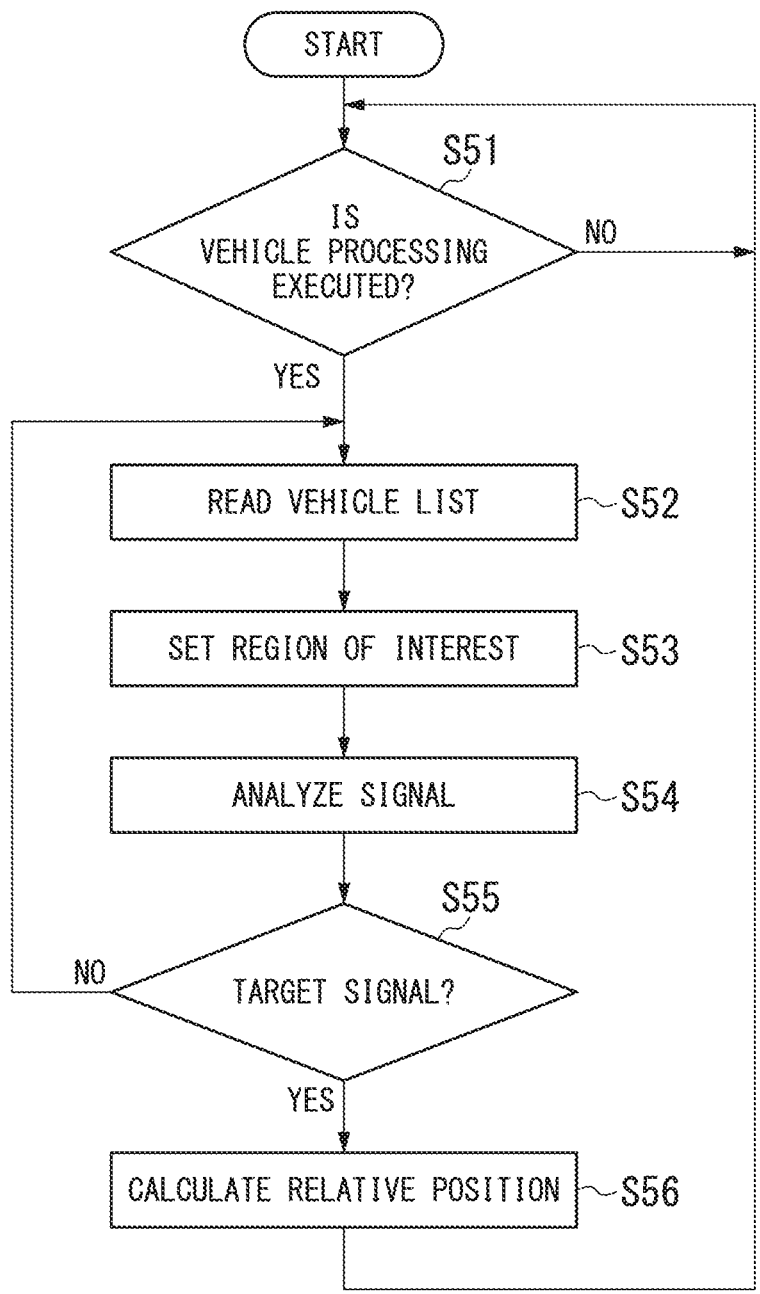
FIG. 20 is a flowchart illustrating an example of vehicle processing in image processing according to an embodiment.

Next, vehicle processing will be described with reference to FIG. 20. FIG. 20 is a flowchart illustrating an example of vehicle processing in the image processing according to the embodiment. In FIG. 20, a process of calculating a relative position of the own vehicle 1 relative to the other vehicle 2 on the basis of information obtained from an optical signal of a vehicle is illustrated.

In FIG. 20, the image processing device 10 determines whether the vehicle processing is executed (step S51). Whether the vehicle processing is executed may be determined, for example, according to whether or not there is an operation from a driver. If the image processing device 10 determines that the vehicle processing is not executed (step S51: NO), the image processing device 10 repeats the process of step S51 until it is determined that the processing is executed and waits.

On the other hand, when the image processing device 10 determines that the vehicle processing is executed (step S51: YES), the image processing device 10 reads the vehicle list (step S52). After executing the process of step S52, the image processing device 10 sets the ROI on the basis of the priority of the read signal source list (step S53). After executing step S53, the image processing device 10 analyzes information included in the optical signal (step S54). The analysis of the information includes, for example, analysis of information such as an ID or coordinates of the signal source for which the ROI is set. After executing the process of step S54, the image processing device 10 determines whether the signal of which the information has been analyzed is a target signal (step S55). In the process of FIG. 20, since a purpose of the process is the calculation of a relative position, the determination can be performed according to whether or not information required to calculate the relative position has been acquired. If the image processing device 10 determines that the signal is not a target signal (step S55: NO), the image processing device 10 returns to the process of step S52 to execute the reading of the vehicle list again.

On the other hand, if the image processing device 10 determines that the signal is a target signal (step S55: YES), the image processing device 10 calculates the relative position (step S56). The calculation of the relative position can be performed by stereoscopic vision, can be performed using absolute coordinates through query to a data server, or can be performed by receiving distance sensor information of a millimeter-wave radar or the like. Further, the image processing device 10 may obtain the relative position using a delay time of the transmission signal that is transmitted by the other vehicle 2. A specific method of obtaining the relative position using the delay time of the transmission signal that is transmitted by the other vehicle 2 will be described below with reference to FIG. 26.

Next, items of the infrastructure list that are registered by the image processing device 10 in step S153 of FIG. 7 will be described with reference to FIG. 21. FIG. 21 is a diagram illustrating an example of the items of the infrastructure list that are used in the image processing according to the embodiment. The items of the infrastructure list illustrated in FIG. 21 are items of the infrastructure stored for each light source.

In FIG. 21, the infrastructure list items include the following items: ID, time, a type, relative coordinates, coordinates, an address, a state, a priority, a priority state, and a processing state. The infrastructure list is assumed to have information on each item.

The ID is identification information that the light source uniquely has. For information on the ID, text data such as alphanumeric data or a name, or the like may be used as information for uniquely identifying a light source. For example, information on coordinates described below, address information, or the like may be used.

The time is the time at which the information on the infrastructure list was last updated. For example, a time limit of storage of the infrastructure list of the light source may be determined using information on the time. Since a time in which one light source of a fixed infrastructure that can be captured by the imaging unit 12 is about several seconds in a case in which the own vehicle 1 travels, the infrastructure list of the light source exceeding a predetermined storage time limit from a travel speed or in an invisible range from a vehicle position may be discarded (unused).

The type is information on a type of light source of the infrastructure. The type of light source is, for example, a street lamp, a traffic light, or a sign. The image processing device 10 can change processing content according to a type of light source. For example, if the type of infrastructure is a traffic light, the image processing device 10 may input a current "color" of the traffic light in an item of a state to be described below. Further, if the type is a sign, the image processing device 10 may perform a character recognition process on the captured image captured by the imaging unit 12 to recognize character information displayed in the sign. The sign includes a light source that emits light information without displaying the character information.

The relative coordinates are information on relative coordinates between the own vehicle 1 and the light source. The relative coordinates are, for example, a direction or a distance from the own vehicle 1 (imaging unit 12) to the light source. The direction to the light source is an azimuth and an elevation angle (including a depression angle) corrected with a posture of the vehicle from the imaging unit 12 to the light source.

The direction can be acquired using the position of the captured image captured by the imaging unit 12. The distance can be obtained directly from a phase (arrival time) of the optical signal that is transmitted from the light source, and is changed along with the direction using a position posture estimation result for the vehicle by an internal sensor with the movement of the vehicle. The distance may be calculated using the above-described resection on the basis of information on the direction, and coordinates to be described below.

The coordinates are absolute coordinates of the light source of the infrastructure. The absolute coordinates include longitude, latitude, and altitude information. Information on the coordinates may be acquired directly from the light source using the information included in the optical signal or may be acquired from the data server 9 as described above.

The address is a network address of the light source. The light source illustrated in FIG. 21 is assumed to have a network address in Internet communication. The network address is used by the communication unit 21 in communication using the Internet.

The state is information on a state of the light source. The information on the state is, for example, a state of a color of a traffic light of blue, yellow, and red if the infrastructure is a traffic light, and is a time for which each state can continue and a time spent in a current state. By including the state of the color of the traffic light in the optical signal, it is possible to assist with driving of the own vehicle 1.

The priority is a value of a weight of a priority described in FIGS. 24 and 25. In this embodiment, a numerical value increases when the priority is higher. Further, the priority state is an integral value (total value) when the priority is added to each frame (according to the number of times of readout). The ROI is set in descending order of value of the priority state. A higher priority is set when a target is desired to have a high frequency of detection. For example, the priority is high since a possibility of a vehicle reflected to the left being closer is high in the case of the left lane. The priority is high since a possibility of a vehicle having a great elevation angle being closer is high in the case of the infrastructure. The priority state is reset when a waiting state starts.

The processing state is information indicating a tracking state of the light source. The tracking state is any one of a waiting state and a tracking state. The waiting state is a state when a setting in the ROI is not performed in any number of times of readout, and the tracking state is a state when a setting in the ROI is performed in any number of times of readout.

Information on the infrastructure list can be shared with the data server 9 illustrated in FIG. 1.

For example, if information that can be acquired from the signal source is information on the ID of the light source, the image processing device 10 may transmit the information on the ID to the data server 9 and acquire, from the data server 9, a name of the light source, information on a type, information on the coordinates, or the like searched for on the basis of the information on the ID by the data server 9. The information on the infrastructure list can include information preset in the infrastructure list, information acquired from the signal source, information acquired from the data server 9, or information obtained by performing calculation or the like on the basis of such information.

Further, although the case in which one piece of information is input to each item has been described in FIG. 21, a plurality of pieces of information may be input to each item. For example, two pieces of information including alphanumeric information and text information of a name may be input to the item of the ID. Further, two pieces of information including coordinates of the World Geodetic System and coordinates of the Japanese geodetic system may be input to the item of the coordinates.

Next, vehicle list items used in common in the preceding vehicle list that is registered in step S156 of FIG. 7, the left peripheral vehicle list that is registered in step S159, or the right peripheral vehicle list that is registered in step S161 will be described with reference to FIG. 22. FIG. 22 is a diagram illustrating an example of vehicle list items used in the image processing according to the embodiment.

In FIG. 22, the vehicle list items include the following items: an ID, a time, a type, relative coordinates, coordinates, an address, a road ID, a travel lane, a vehicle speed, orientation, a state, a priority, a priority state, and a processing state. Since the items of the ID, the time, the relative coordinates, the coordinates, the address, the priority, the priority state, and the processing state in the vehicle list items are the same as the infrastructure list items in FIG. 21, description thereof will be omitted.

The item of the type in the vehicle list items is, for example, information such as a four-wheeler, a two-wheeler, a light vehicle, or a human. The type may be a type based on a legal classification of a normal car, a small car, or the like. A signal source may be a signal source attached to a human, an animal, or the like other than the vehicle. In FIG. 22, for convenience, a human is illustrated as a type of vehicle list item. Moreover, the type may be information for vehicles such as a truck or a passenger car.

The road ID is an ID of a road on which the own vehicle and the other vehicles travel. The road ID is information for uniquely specifying a road on which a vehicle travels. The road ID may be included in, for example, information that is transmitted from a signal source such as a street lamp or a traffic light.

The traveling lane is information on a lane in which other vehicles travel. The travelling lane is information indicating a traveling lane of a vehicle, and is information such as a left lane, a center lane, a right lane, or an opposite lane. The preceding vehicle list, the left peripheral vehicle list, and the right peripheral vehicle list can be classified according to the information on the travel lane. Accordingly, the preceding vehicle list, the left peripheral vehicle list, and the right peripheral vehicle list may be registered in the same vehicle list. The information on the traffic lane may be updated when the own vehicle or the other vehicle changes lanes or when a situation of the lane of the road on which the vehicle travels is changed.

The vehicle speed is information on a travel speed of the other vehicle or a speed difference between the other vehicle and the own vehicle. The orientation is an orientation of a direction of a travel direction of the other vehicle. The state is information on a motion state of the other vehicle. The motion state is a state such as stopping, accelerating, decelerating, cruise control, or lane changing, and may be indicated by a numerical value of gravitational acceleration or the like. The information on the vehicle speed, the orientation, or the state may be used, for example, when a scan range is predicted to track a signal source of the other vehicle.

The items described in FIG. 21 or 22 are illustrative, and types and content of the items are not limited.

Next, a specific example of the infrastructure list will be described with reference to FIG. 23. FIG. 23 is a diagram illustrating an example of the infrastructure list in FIG. 21. FIG. 23 illustrates a specific example of light source A, light source B, and light source C for the infrastructure list items described in FIG. 21. The following items: ID, time, a type, relative coordinates, coordinates, an address, a state, a priority, a priority state, and a processing state, are the same as the infrastructure list items described with reference to FIG. 21. In FIG. 23, the relative coordinates are a coordinate value that is calculated by camera calibration.

Next, a setting of a scan frequency based on the ROI that is set in FIG. 8 or the like will be described with reference to FIGS. 24 and 25. FIG. 24 is a diagram illustrating an example of the setting of a scan frequency of the image processing according to the embodiment. FIG. 25 is a diagram illustrating another example of the setting of the scan frequency in the image processing according to the embodiment. FIG. 24 illustrates a case in which there is one ROI to be set. FIG. 25 illustrates a case in which there are two ROIs to be set.

In FIGS. 24 and 25, the number of reading times is the number of times a process of reading the infrastructure list or the vehicle list that is executed in step S211, S221, S231, or S241 is executed. In FIG. 24, a case in which the light sources to be registered are three light sources: light source A, light source B, and light source C, is illustrated. It is assumed that a priority of the light source A is set to 4, a priority of light source B is set to 2, and a priority of light source C is set to 1. Further, in FIG. 25, a case in which the light sources to be registered are five light sources: light source A, light source B, light source C, light source D, and light source E, is illustrated. In FIG. 24, it is assumed that a priority of the light source A is set to 4, a priority of the light source B is set to 2, and a priority of the light source C is set to 1. In FIG. 25, it is assumed that a priority of the light source A is set to 5, a priority of the light source B is set to 4, a priority of the light source C is set to 3, a priority of the light source D is set to 2, and a priority of the light source E is set to 1.

In FIGS. 24 and 25, the image processing device 10 adds a value of the priority to the priority state for each time of readout. If the priority state is the same, the image processing device 10 sets the light source with a high priority in the ROI. Filled areas illustrated in FIGS. 24 and 25 indicate the priority states that have been set in the ROI by the image processing device 10. The image processing device 10 resets the priority state of the light source set in the ROI to return the priority state to zero for the next readout. In FIG. 24, the image processing device 10 is assumed to set one light source with the highest priority state in the ROI in each time of the readout. Further, in FIG. 25, the image processing device 10 is assumed to set two light sources with the high priority state in the ROI in each time of the readout.

For example, in FIG. 24, in the number of times of readout 1, since each priority state is 0, the image processing device 10 sets the light source A (priority: 4) to have a highest priority in the ROI. In the number of times of readout 2, the image processing device 10 resets the priority state of the light source A to 0, adds a priority of 2 to the priority state of the light source B to set the priority state to 2, and adds a priority of 1 to the priority state of the light source C to set the priority state to 1. In the number of times of readout 2, the image processing device 10 sets the light source B with the highest priority state of 2 in the ROI. The image processing device 10 then repeats the same process for each number of times of readout to set one ROI. Further, in FIG. 25, in the number of times of readout 1, since each priority state is 0, the image processing device 10 sets both of the light source A (priority: 5) and the light source B (priority: 4) having high priority in the ROIs. In the number of times of readout 2, the image processing device 10 resets the priority states of the light source A and the light source B to 0, adds a priority of 3 to the priority state of the light source C to set the priority state to 3, adds a priority of 2 to the priority state of the light source D to set the priority state to 2, and adds a priority of 1 to the priority state of the light source E to set the priority state to 1. In the number of times of readout 2, the image processing device 10 sets the light source C and the light source D of which the priority state is high, in the ROI. Hereinafter, the image processing device 10 repeats the same process for each number of times of readout to set two ROIs.

Next, mutual communication between the two vehicles and a method of calculating an inter-vehicle distance will be described with reference to FIG. 26.

Figure 26:
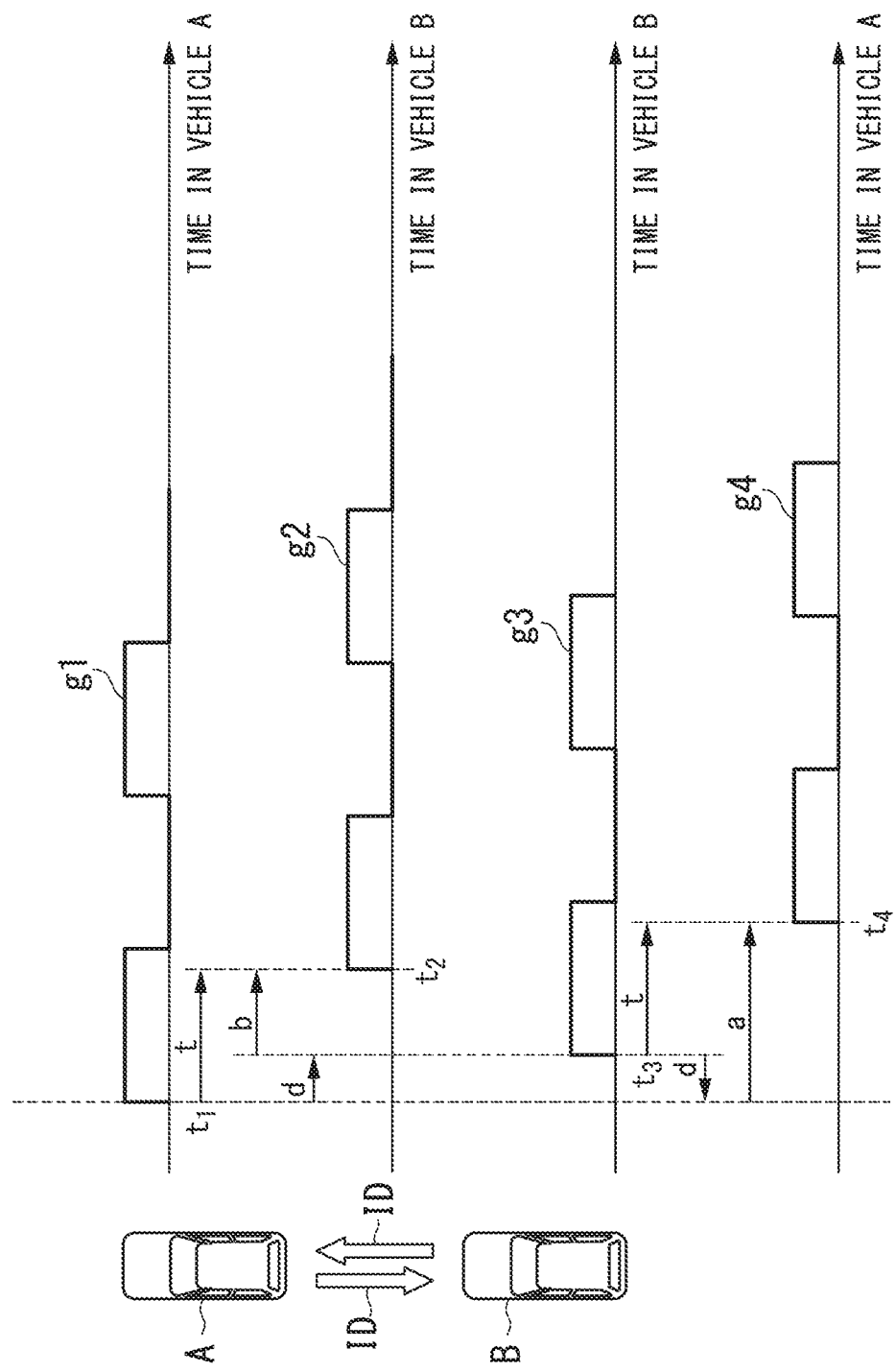
FIG. 26 is a diagram illustrating mutual communication between two vehicles according to this embodiment.

FIG. 26 is a diagram illustrating mutual communication between two vehicles according to this embodiment. In FIG. 26, a vertical axis indicates whether a signal is at an L (low) level or an H (high) level, and a horizontal axis indicates time. Further, in an example illustrated in FIG. 26, it is assumed that the vehicle B travels in a travel direction of the vehicle A that moves downward.

A waveform g1 indicates a transmission signal emitted by the vehicle A. A waveform g2 is a signal when the vehicle B receives the transmission signal emitted by the vehicle A. A waveform g3 indicates a transmission signal emitted by the vehicle B. A waveform g4 is a signal when the vehicle A receives the transmission signal emitted by the vehicle B.

Time $t_1$ indicates a timing at which the vehicle A emits light. Time $t_2$ indicates a timing at which the vehicle B receives the light emitted by the vehicle A. Time $t_3$ indicates a timing at which the vehicle B emits light. Time $t_2$ indicates a timing at which the vehicle A receives the light emitted by the vehicle B.

Further, t indicates a true delay time. b indicates a delay time measured using a reference time of the vehicle B. d indicates a synchronization error. In this embodiment, the synchronization error is also referred to as a phase error.

a indicates a delay time measured using a reference time of the vehicle A. In this embodiment, a and b are also referred to as apparent delay time.

As illustrated in FIG. 5, the true delay time t is expressed as shown in Equations (11) and (12) below.

$$b+d=t \quad (11)$$

$$a-d=t \quad (12)$$

From Equations (11) and (12), a+b=2t, and a true time delay t is expressed as shown in Equation (13) below. Further, a synchronization error d is expressed as shown in Equation (14) below from Equations (11) and (12).

$$t=(a+b)/2 \quad (13)$$

$$d=(a-b)/2 \quad (14)$$

Since the transmission signal is an optical signal, an inter-vehicle distance L between the vehicle A and the vehicle B can be converted using Equation (15) below. In Equation (15), c is the speed of light (299,792,458 [m/s]).

$$L=t \cdot c \quad (15)$$

Thus, the vehicle A and the vehicle B can calculate an inter-vehicle distance between the vehicle A and the vehicle B by measuring an apparent delay time (a, b) between the vehicles and transmitting the apparent delay time (a, b) to each other. The inter-vehicle distance may be calculated on the basis of an average value of the apparent delay time (a, b) measured several times. The vehicle can calculate the true delay time t through Equation (11) or (12) using the calculated synchronization error d and the apparent delay time obtained for each optical communication. The vehicle transmits and receives the apparent delay time through wireless communication via a transmission and reception unit 112. The vehicle transmits the synchronization error via the transmission and reception unit 112 through wireless communication. The vehicle may transmit the apparent delay time and the synchronization error through optical communication according to a frequency of a used reference signal.

As described above, the image processing device of this embodiment can acquire information that is transmitted from a plurality of signal sources of which the number, position, priority, or the like is dynamically changed, by including the control unit and the analysis unit.

Further, according to the image processing device, it is possible to scan the captured image at a frequency according to the signal source. That is, according to the image processing device, it is possible to scan a fixed signal source such as a street lamp or a traffic light that is imaged on an upper side of the captured image at a first frequency, and to prevent a moving signal source such as another vehicle that is difficult to image on the upper side of the captured image from being scanned at the first frequency. Accordingly, according to this embodiment, it is possible to perform scan of a suitable signal source when the image processing device is applied to an ITS.

Further, according to the image processing device, detection of an appearing signal source is easy.

Further, according to the image processing device, it is possible to achieve the scan frequency suitable for the signal source by calculating the priority according to the attribute of the signal source.

Further, according to the image processing device, it is possible to acquire information on the signal source in the fourth region with high accuracy, and to acquire information with accuracy suitable for a signal source outside the fourth region. According to the image processing device, for example, it is possible to acquire the information on the other vehicle having greater influence on the own vehicle with high accuracy by setting the fourth region in a region in which an influence on the own vehicle is great, and to acquire the information on the other vehicle having a small influence on the own vehicle with appropriate accuracy.

Further, according to the image processing device, it is possible to acquire information for the signal source outside the fourth region with accuracy according to the position of the signal source. According to the image processing device, for example, in another vehicle having a small influence on the own vehicle, it is possible to acquire information with accuracy suitable for the position of the other vehicle.

Further, according to the image processing device, it is possible to acquire information of a forward vehicle or the like traveling in the same lane as the own vehicle with high accuracy.

Further, according to the image processing device, it is possible to accurately calculate the position of the own vehicle.

The various above-described processes according to this embodiment can be performed by recording a program for realizing functions constituting the device described in this embodiment on a computer-readable recording medium, loading the program recorded on the recording medium to a computer system, and executing the program. The "computer system" stated herein includes an OS or hardware such as a peripheral device. Further, the "computer system" also includes a homepage providing environment (or display environment) if a WWW system is being used. Further, the "computer-readable recording medium" includes a flexible disk, a magneto-optical disc, a ROM, a writable nonvolatile memory such as a flash memory, or a portable medium such as a CD-ROM, or a storage device such as a hard disk built in a computer system.

Further, the "computer-readable recording medium" also includes a recording medium that holds a program for a certain time, such as a volatile memory (for example, a dynamic random access memory (DRAM)) inside a computer system including a server or a client when a program is transmitted over a network such as the Internet or a communication line such as a telephone line. Further, the program may be transmitted from a computer system in which the program is stored in a storage device or the like to other computer systems via a transfer medium or by transfer waves in the transfer medium. Here, the "transfer medium" for transferring the program refers to a medium having a function of transferring information, such as a network (communication network) such as the Internet or a communication line such as a telephone line. Further, the program may be a program for realizing some of the above-described functions. Alternatively, the program may be a program capable of realizing the above-described functions in combination with a program previously stored in the computer system, that is, a so-called differential file (differential program).

While the embodiments of the present invention have been described above with reference to the drawings, a specific configuration is not limited to these embodiments, and various changes that do not depart from the gist of the present invention are also included.

What is claimed is:

1. An image processing device, comprising:
a processor, wherein the processor is configured to function as:
a control unit configured to control a scan frequency of a region of an imaging unit; and
an analysis unit configured to analyze a captured image captured in the imaging unit,
wherein the analysis unit is configured to
analyze the captured image to detect an optical signal transmitted from a signal source,
identify an attribute of the signal source on the basis of information included in the detected optical signal, and
set a region including the signal source in the captured image in a region with a different scan frequency, and
the control unit is configured to control a scan frequency of the imaging unit for each region that is set in the captured image,
wherein the control unit is configured to:
scan a first region that is set in the captured image at a first frequency;
scan a second region that is set in the captured image at a second frequency; and
scan a third region including the signal source at a third frequency based on the identified attribute of the signal source,
wherein the control unit is configured to set the second region in a region in which the third region is highly likely to appear.

2. The image processing device according to claim 1, wherein the control unit is configured to set the first region on an upper side of the captured image.

3. The image processing device according to claim 1, wherein the analysis unit is configured to
calculate a priority on the basis of the attribute of the signal source, and
set the third frequency on the basis of the calculated priority.

4. The image processing device according to claim 1, wherein the analysis unit is configured to analyze the captured image to identify a fourth region included in the captured image, and
determine whether the third region is in the fourth region when the identified attribute of the signal source is a first attribute, and
the control unit is configured to set the third frequency when the third region is determined to be in the fourth region to be higher than the third frequency when the third region is determined not to be in the fourth region.

5. The image processing device according to claim 4, wherein the analysis unit is configured to
analyze the captured image to detect optical signals transmitted from a plurality of signal sources, and
set a plurality of third regions in the captured image, and
when each of the plurality of third regions is determined not to be in the fourth region, the control unit is configured to change the third frequency according to respective positions in the captured image of the plurality of third regions.

6. The image processing device according to claim 4, wherein the analysis unit is configured to
identify the same lane as the lane on a road on which the own vehicle travels as the fourth region, and
determine whether the third region including a signal source of another vehicle travels on the same lane as the own vehicle when the first attribute is the other vehicle.

7. The image processing device according to claim 1, wherein the analysis unit is configured to calculate a position of an own vehicle on the basis of coordinate information included in the detected optical signal when the identified attribute of the signal source is a second attribute.

8. The image processing device according to claim 1, wherein an attribute of the signal source is information on whether the signal source is infrastructure or a vehicle, and information on a position of a signal source relative to an own vehicle.

9. An image processing method, comprising:
a control step of controlling a scan frequency of a region of an imaging unit; and
an analysis step of analyzing a captured image captured in the imaging unit,
wherein the analysis step includes steps of
analyzing the captured image to detect an optical signal transmitted from a signal source,
identifying an attribute of the signal source on the basis of information included in the detected optical signal, and
setting a region including the signal source in the captured image in a region with a different scan frequency, and
the control step includes a step of controlling a scan frequency of the imaging unit for each region that is set in the captured image,
wherein the control step includes steps of:
scanning a first region that is set in the captured image at a first frequency;
scanning a second region that is set in the captured image at a second frequency; and
scanning a third region including the signal source at a third frequency based on the identified attribute of the signal source, and
wherein the control step further includes a step of setting the second region in a region in which the third region is highly likely to appear.

10. A non-transitory computer readable medium storing an image processing program that causes a computer to execute:
a control procedure of controlling a scan frequency of a region of an imaging unit; and
an analysis procedure of analyzing a captured image captured in the imaging unit,
wherein the analysis procedure includes procedures of
analyzing the captured image to detect an optical signal transmitted from a signal source, identifying an attribute of the signal source on the basis of information included in the detected optical signal, and setting a region including the signal source in the captured image in a region with a different scan frequency, and the control procedure includes a procedure of controlling a scan frequency of the imaging unit for each region that is set in the captured image, wherein the control procedure includes procedures of:

scanning a first region that is set in the captured image at a first frequency;

scanning a second region that is set in the captured image at a second frequency; and scanning a third region including the signal source at a third frequency based on the identified attribute of the signal source, and wherein the control procedure further includes a procedure of setting the second region in a region in which the third region is highly likely to appear.

* * * * *